United States Patent
Tae et al.

(10) Patent No.: US 9,551,906 B2
(45) Date of Patent: Jan. 24, 2017

(54) LIQUID CRYSTAL DISPLAY

(71) Applicant: Samsung Display Co., Ltd., Yongin (KR)

(72) Inventors: Chang Il Tae, Seoul (KR); Sung Hoon Kim, Seoul (KR); Hyun-Ho Kang, Ansan-si (KR); Yong Woo Hyung, Yongin-si (KR); Jang-Il Kim, Bucheon-si (KR); Eun-Kil Park, Cheonan-si (KR); Jeong Soo Choi, Suwon-si (KR); Bo Yeong Kim, Asan-si (KR); Jae-Jin Song, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/702,041

(22) Filed: May 1, 2015

(65) Prior Publication Data

US 2015/0234240 A1    Aug. 20, 2015

Related U.S. Application Data

(62) Division of application No. 13/588,479, filed on Aug. 17, 2012, now Pat. No. 9,046,713.

(30) Foreign Application Priority Data

Jan. 26, 2012   (KR) .................. 10-2012-0007954
Feb. 8, 2012    (KR) .................. 10-2012-0013020

(51) Int. Cl.
    *G02F 1/1343*    (2006.01)
    *G02F 1/1368*    (2006.01)

(52) U.S. Cl.
    CPC ....... *G02F 1/134309* (2013.01); *G02F 1/1368* (2013.01); *G02F 1/13439* (2013.01)

(58) Field of Classification Search
    CPC ............ G02F 1/134309; G02F 1/13439; G02F 1/1368; G02F 1/133707
    See application file for complete search history.

(56) References Cited

U.S. PATENT DOCUMENTS

6,424,398 B1   7/2002   Taniguchi
6,630,979 B2   10/2003  Yang
(Continued)

FOREIGN PATENT DOCUMENTS

EP   2372442   10/2011
JP   4571727   9/2001
(Continued)

OTHER PUBLICATIONS

Partial European Search Report dated Jan. 25, 2013, in European Patent Application No. 12186288.2.
(Continued)

*Primary Examiner* — Nathanael R Briggs
(74) *Attorney, Agent, or Firm* — H.C. Park & Associates, PLC

(57) ABSTRACT

A liquid crystal display is provided. A liquid crystal display includes: a first substrate; a thin film transistor disposed on the first substrate; and a first electrode disposed on the thin film transistor and connected to an output terminal of the thin film transistor, wherein the first electrode includes a first region and a second region each including a plurality of minute branches separated from each other by open parts, portions of at least two minute branches among the plurality of minute branches are connected to form a plurality of minute plate branches, and wherein the minute plate branch has a wider width than a minute branch.

20 Claims, 27 Drawing Sheets

(56) References Cited

U.S. PATENT DOCUMENTS

| | | |
|---|---|---|
| 7,405,796 B2 | 7/2008 | Lu et al. |
| 7,583,346 B2 | 9/2009 | Hsieh et al. |
| 7,817,234 B2 | 10/2010 | Hung |
| 8,189,160 B2 | 5/2012 | Kim |
| 2007/0002241 A1* | 1/2007 | Hung ................ G02F 1/133707 349/139 |
| 2009/0086144 A1 | 4/2009 | Chen et al. |
| 2009/0086149 A1 | 4/2009 | Kim |
| 2009/0310075 A1 | 12/2009 | Kim |
| 2009/0310076 A1* | 12/2009 | Hsieh ................ G02F 1/134309 349/144 |
| 2010/0053518 A1 | 3/2010 | Jeong et al. |
| 2010/0053526 A1 | 3/2010 | Kye et al. |
| 2010/0103357 A1 | 4/2010 | Kye et al. |
| 2010/0182556 A1 | 7/2010 | Oh et al. |
| 2010/0231845 A1 | 9/2010 | Seong et al. |
| 2011/0013129 A1 | 1/2011 | Jeong et al. |
| 2011/0063557 A1 | 3/2011 | Kim et al. |
| 2011/0199568 A1 | 8/2011 | Morishita et al. |
| 2011/0216261 A1 | 9/2011 | Han et al. |
| 2011/0242443 A1 | 10/2011 | Choi et al. |
| 2011/0242468 A1 | 10/2011 | Choi et al. |
| 2011/0261295 A1 | 10/2011 | Kim |
| 2012/0050641 A1 | 3/2012 | Chen et al. |
| 2012/0307172 A1 | 12/2012 | Yoshida |
| 2015/0077693 A1* | 3/2015 | Chen ................ G02F 1/133707 349/144 |

FOREIGN PATENT DOCUMENTS

| | | |
|---|---|---|
| JP | 2002-169159 | 6/2002 |
| JP | 4202062 | 7/2003 |
| JP | 4765319 | 8/2006 |
| JP | 3926056 | 6/2007 |
| JP | 4391634 | 12/2009 |
| JP | 2010-079316 | 4/2010 |
| JP | 2010-128211 | 6/2010 |
| JP | 4765318 | 9/2011 |
| KR | 10-2007-0014703 | 2/2007 |
| TW | 201122685 | 7/2011 |

OTHER PUBLICATIONS

Extended European Search Report dated Apr. 19, 2013, in European Patent Application No. 12186288.2.
Notice of Allowance dated Feb. 17, 2015, in U.S. Appl. No. 13/588,479.
Final Rejection dated Dec. 15, 2014, in U.S. Appl. No. 13/588,479.
Non-Final Rejection dated Jul. 31, 2014, in U.S. Appl. No. 13/588,479.

* cited by examiner

LIQUID CRYSTAL DISPLAY

CROSS-REFERENCE TO RELATED APPLICATION

This application is a division of U.S. patent application Ser. No. 13/588,479, filed on Aug. 17, 2012, which claims priority from and the benefit of Korean Patent Application No. 10-2012-0007954, filed on Jan. 26, 2012, and Korean Patent Application No. 10-2012-0013020, filed on Feb. 8, 2012, each of which is incorporated herein by reference for all purposes as if fully set forth herein.

BACKGROUND OF THE INVENTION

Field of the Invention

Exemplary embodiments of the present invention relate to a liquid crystal display.

Discussion of the Background

A liquid crystal display panel, which is one of the more common types of flat panel displays currently in use, includes two sheets of substrates with field generating electrodes such as a pixel electrode and a common electrode, and a liquid crystal layer interposed therebetween.

The liquid crystal display generates electric fields in the liquid crystal layer by applying voltages to the field generating electrodes, determines the alignment of liquid crystal molecules of the liquid crystal layer by the generated electric field, and controls polarization of incident light to display images.

The liquid crystal display also includes a switching element connected to each pixel electrode, and a plurality of signal lines including gate lines and data lines to apply the voltage to the pixel electrode by controlling the switching element.

Among the liquid crystal displays, a vertically aligned mode ("VM mode") liquid crystal display in which long axes of the liquid crystal molecules are arranged to be vertical to a display panel in the absence of an electric field has been in the limelight due to its high contrast ratio and wide viewing angle thereof.

Among the vertical alignment (VA) mode LCD devices, the liquid crystal display of a SVA (super vertical alignment) mode controls a liquid crystal direction through a vertical electric field and a horizontal electric field by using an electrode pattern having a minute slit structure, thereby increasing transmittance.

However, in the liquid crystal display of the SVA mode, spots may be generated because of non-uniform luminance while reducing an interval of the minute slits or minute branches.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a liquid crystal display capable of ensuring a spot margin, and improving transmittance and texture controllability.

Additional features of the invention will be set forth in the description which follows, and in part will be apparent from the description, or may be learned by practice of the invention.

An exemplary embodiment of the present invention discloses a liquid crystal display that includes: a first substrate; a thin film transistor disposed on the first substrate; and a first electrode disposed on the thin film transistor and connected to an output terminal of the thin film transistor, wherein the first electrode includes a first region and a second region each including a plurality of minute branches separated from each other by open parts, portions of at least two minute branches among the plurality of minute branches in the second region are connected to form a plurality of minute plate branches, and wherein the minute plate branch has a wider width than a minute branch.

Another exemplary embodiment of the present invention discloses a liquid crystal display that includes: a first substrate; a thin film transistor disposed on the first substrate; and a first electrode disposed on the thin film transistor and connected to an output terminal of the thin film transistor, wherein the first electrode includes a cross stem including a transverse stem and a longitudinal stem intersecting the transverse stem, and the first electrode includes a first region including a plurality of first open parts connected to the cross stem and a second region including a plurality of second open parts separated from the cross stem and disposed at an edge portion of the first electrode, and the interval between the first open parts is larger than the interval between the second open parts.

Still another exemplary embodiment of the present invention discloses a liquid crystal display that includes: a first substrate; a thin film transistor formed on the first substrate; and a first electrode disposed on the thin film transistor and connected to an output electrode of the thin film transistor, wherein the first electrode includes a first region including a plurality of branches separated from each other via a first open part, and a second region where portions of at least two branches among a plurality of branches forming a plurality of plate branches have a wider width than a branch, the plurality of plate branches are separated from each other via a second open part, and the second open part has a wider width than the first open part.

As described above, according to exemplary embodiments of the present invention, the branches are partially grouped to form a plate branch such that transmittance by the plate branches is improved and the width of the branches is increased so as to ensure the spot margin. Also, a predetermined portion of the branch is maintained thereby having texture controllability.

Also, the interval of the open part between the plate branches is wider than the interval of the open part between the branches such that the luminance deterioration may be improved.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
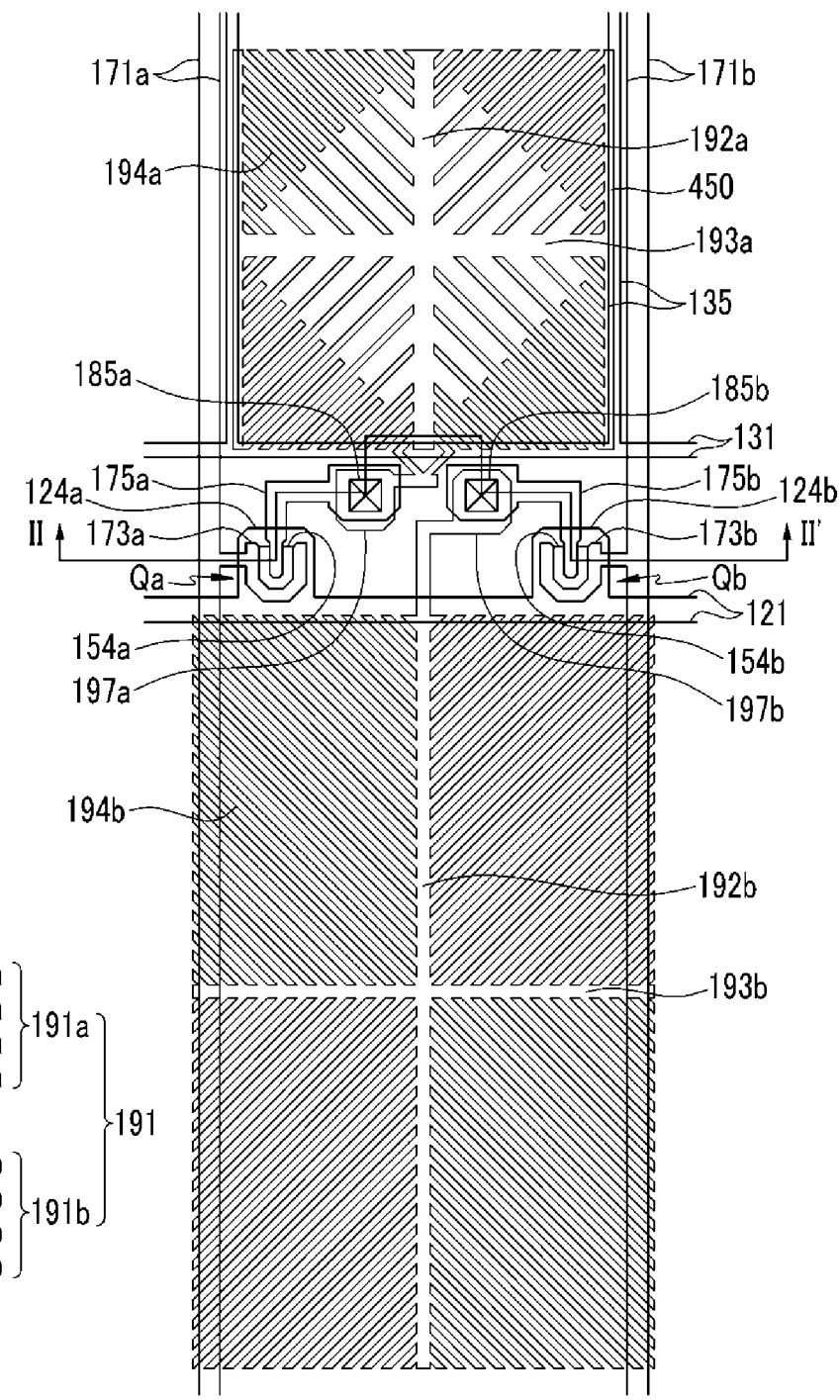
FIG. 1 is a top plan view of a liquid crystal display according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In the drawings, the thickness of layers, films, panels, regions, etc., may be exaggerated for clarity. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. In contrast, It will be understood that when an element such as a layer, film, region, or substrate is referred to as being "beneath" another element, it can be directly beneath the other element or intervening elements may also be present. Meanwhile, when an element is referred to as being "directly beneath" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be explained in detail with reference to the accompanying drawings.

Figure 2:
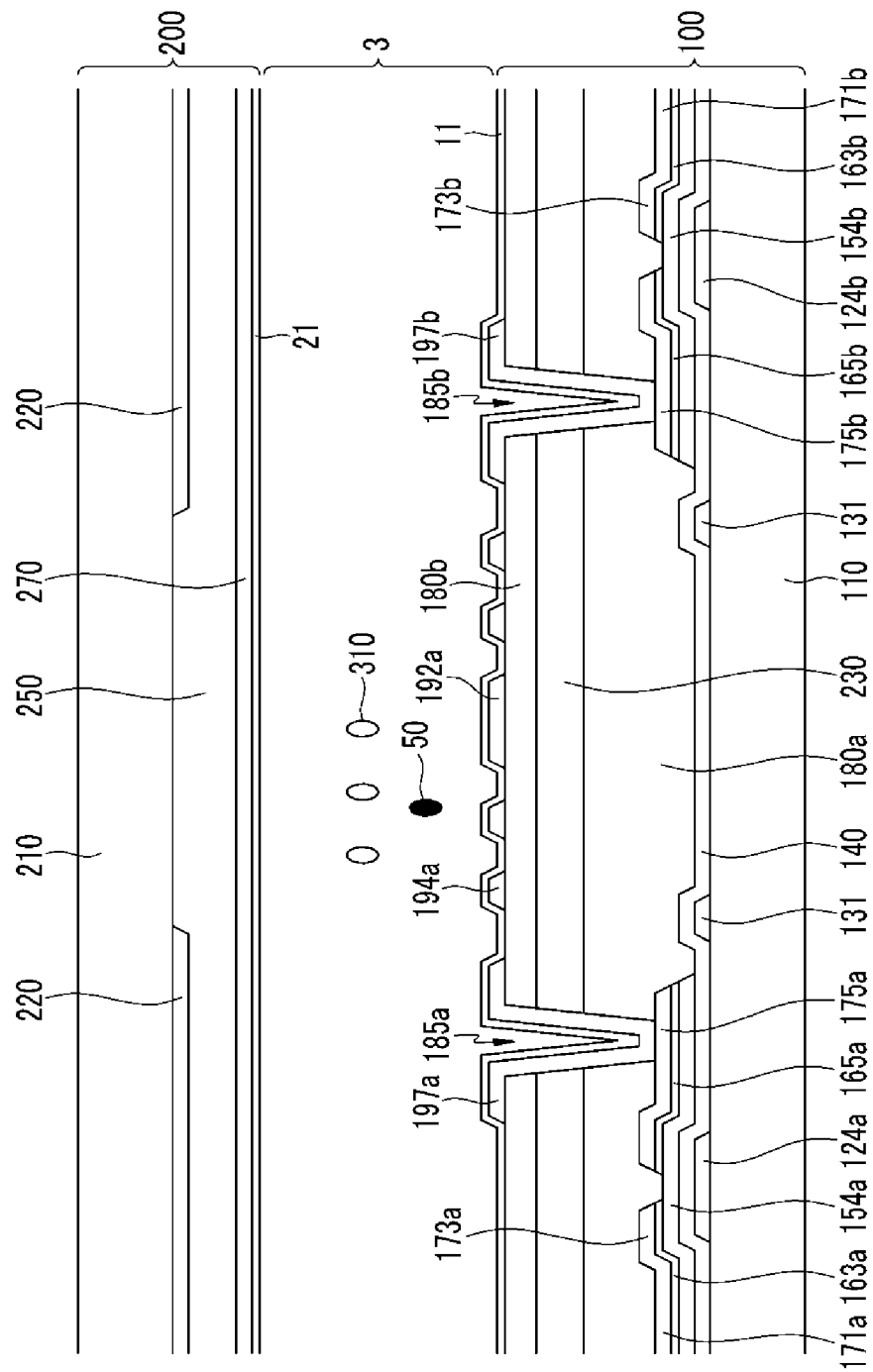
FIG. 2 is a cross-sectional view taken along the line II-II' of FIG. 1.
Figure 3:
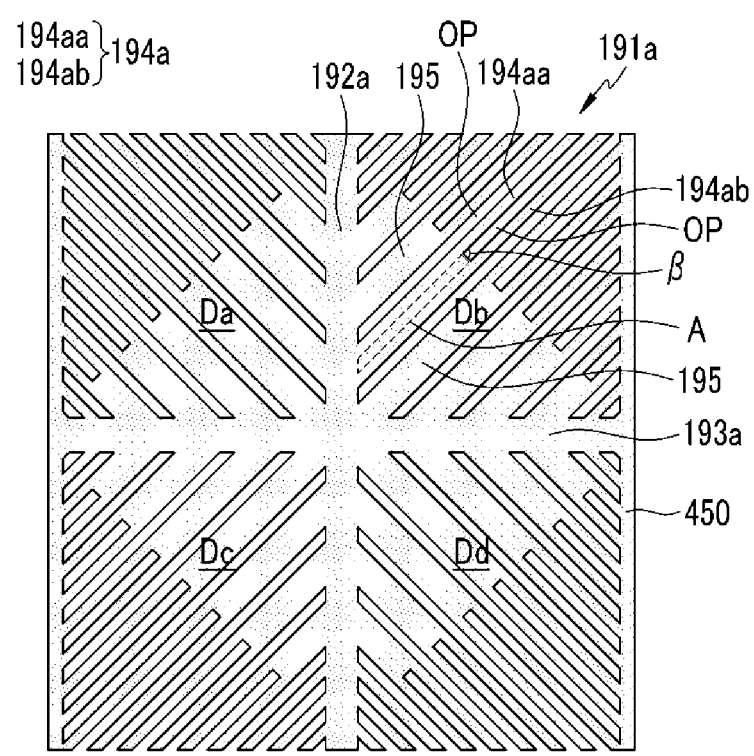
FIG. 3 is a top plan view of a pattern of one sub-pixel electrode in the exemplary embodiment of FIG. 1.

FIG. 1 is a top plan view of a liquid crystal display according to an exemplary embodiment of the present invention. FIG. 2 is a cross-sectional view taken along the line II-II' of FIG. 1. FIG. 3 is a top plan view of a pattern of one sub-pixel electrode in the exemplary embodiment of FIG. 1.

Firstly, referring to FIG. 1 and FIG. 2, a liquid crystal display according to an exemplary embodiment of the present invention may include a lower panel 100 and an upper panel 200 facing each other, and a liquid crystal layer 3 interposed between the two display panels 100 and 200.

Firstly, the lower panel 100 will be described.

A plurality of gate lines 121 and a plurality of storage electrode lines 131 and 135 are disposed on an insulation substrate 110.

The gate lines 121 transmit gate signals and generally extend in a transverse direction. Each gate line 121 includes a plurality of first and second gate electrodes 124a and 124b protruding upward.

The storage electrode lines include stems 131 substantially parallel to the gate lines 121 and a plurality of storage electrodes 135 extending therefrom. The storage electrode lines 131 and 135 may function as shielding electrodes in a structure using an organic layer under a pixel electrode 191.

The shape and arrangement of the storage electrode lines 131 and 135 may be variously modified.

A gate insulating layer 140 may be disposed on the gate lines 121 and the storage electrode lines 131 and 135, and a plurality of semiconductors 154a and 154b made of amorphous silicon, crystalline silicon, or an oxide semiconductor may be disposed on the gate insulating layer 140.

A plurality of pairs of ohmic contacts 163a and 163b, and 165a and 165b, may be formed on the semiconductors 154a and 154b. The plurality of pairs of ohmic contacts 163a and 163b, and 165a and 165b may be omitted if the semiconductors 154a and 154b are made of an oxide semiconductor. The ohmic contacts may be formed of a material such as n+ hydrogenated amorphous silicon in which an n-type impurity is doped with a high concentration, or of silicide.

A plurality of pairs of data lines 171a and 171b, a plurality of pairs of first and second source electrodes 173a and 173b connected to the data lines 171a and 171b, and a plurality of pairs of first and second drain electrodes 175a and 175b facing the source electrodes 173a and 173b are formed on the ohmic contacts 163a, 163b, 165a, 165b, and the gate insulating layer 140.

The data lines 171a and 171b transmit data signals, extend substantially in the longitudinal direction, and cross the gate lines 121 and the stems 131 of the storage electrode lines. The first and second source electrodes 173a and 173b have a curved "U" shape partially surrounding the first and second gate electrodes 124a and 124b, and the first and second source electrodes 173a and 173b face the first and second drain electrodes 175a and 175b with respect to the first and second gate electrodes 124a and 124b.

The first and second drain electrodes 175a and 175b extend upward with their respective one ends surrounded by the first and second source electrodes 173a and 173b, and the other end thereof may have an expansion having a wide area for connection to another layer.

However, the first and the second source electrodes 173a and 173b may be formed with a "⊂" shape or a "⊃" shape such that the shape and the arrangement of the data lines 171a and 171b may be modified as well as the first and second drain electrodes 175a and 175b. The shape and the arrangement of the data lines 171a and 171b as well as the first and second source electrodes 173a and 173b and the first and second drain electrodes 175a and 175b may be modified in various manners.

The first and second gate electrodes 124a and 124b, the first and second source electrodes 173a and 173b, and the first and second drain electrodes 175a and 175b constitute first and second thin film transistors (TFT) Qa and Qb together with the first and second semiconductors 154a and 154b, and the channels of the first and second thin film transistors Qa and Qb are disposed at the first and second semiconductors 154a and 154b between the first and second source electrodes 173a and 173b and the first and second drain electrodes 175a and 175b, respectively.

The semiconductors 154a and 154b have exposed portions not covered by the data lines 171a and 171b and the drain electrodes 175a and 175b, including a portion thereof between the source electrodes 173a and 173b and the drain electrodes 175a and 175b, respectively.

A lower passivation layer 180a made of silicon nitride or silicon oxide may be disposed on the data lines 171a and 171b, the drain electrodes 175a and 175b, and the exposed portions of the semiconductors 154a and 154b. The lower passivation layer 180a may be formed of a single layer made of silicon nitride or silicon oxide or a dual layer including silicon nitride and silicon oxide.

A color filter 230 may be disposed on the lower passivation layer 180a. The color filter 230 may be disposed in most of the region except for a position where the first thin film transistor Qa and the second thin film transistor Qb are disposed. However, the color filter 230 may extend in a longitudinal direction between the neighboring data lines 171a and 171b. In the present exemplary embodiment, the color filter 230 is disposed in the lower panel 100. However, it may be disposed in the upper panel 200.

An upper passivation layer 180b may be disposed on the color filter 230.

The upper passivation layer 180b may be formed of an organic material having photosensitivity, or an inorganic material. When the upper passivation layer 180b is formed of the organic material, the upper passivation layer 180b may have a function of flattening a layer disposed under the upper passivation layer 180b. When the upper passivation layer 180b is formed of the inorganic material, the upper passivation layer 180b improves transmittance through compensation of a refractive index or shielding a gas emitted from the color filter 230.

The upper passivation layer 180b has a plurality of contact holes 185a and 185b exposing the first and second drain electrodes 175a and 175b as well as the lower passivation layer 180a.

A plurality of pixel electrodes 191 are disposed on the upper passivation layer 180b. The pixel electrodes 191 may be made of a transparent conductive material such as ITO or IZO, or a reflective metal such as aluminum, silver, chromium, or alloys thereof.

Each pixel electrode 191 includes first and second sub-pixel electrodes 191a and 191b that are separated from each other with respect to the gate line 121 interposed therebetween, and the first sub-pixel electrode 191a may include an electrode pattern shown in FIG. 3.

Referring to FIG. 3, the first sub-pixel electrode 191a will be described.

Referring to FIG. 3, the overall shape of the first sub-pixel electrode 191a is a quadrangle, and includes a cross stem having a longitudinal stem 192a and a transverse stem 193a crossing the longitudinal stem 192a. Also, the first sub-pixel electrode 191a is divided into a first sub-region Da, a second sub-region Db, a third sub-region Dc, and a fourth sub-region Dd by the transverse stem 193a and the longitudinal stem 192a. Each of the sub-regions Da, Db, Dc, and Dd includes a plurality of minute branches 194a and a plurality of minute plate branches 195 extending in oblique directions.

The widths of the transverse stem 193a and the longitudinal stem 192a may be the same or different. When the widths of the transverse stem 193a and the longitudinal stem 192a are the same, the width may be about 4 µm to 7 µm, and when the widths of the transverse stem 193a and the longitudinal stem 192a are different, the width of the transverse stem 193a is about 7 µm, and the width of the longitudinal stem 192a is about 5 µm. Here, by differentiating the widths of the transverse stem 193a and the longitudinal stem 192a, side visibility may be further improved.

A plurality of minute plate branches 195 obliquely extend in a left upper direction from the transverse stem 193a or the longitudinal stem 192a in the first sub-region Da, and obliquely extend in a right upper direction from the transverse stem 193a or the longitudinal stem 192a in the second sub-region Db. Also, a plurality of minute plate branches 195 obliquely extend in a left lower direction from the transverse stem 193a or the longitudinal stem 192a in the third sub-region Dc, and obliquely extend in a right lower direction from the transverse stem 193a or the longitudinal stem 192a in the fourth sub-region Dd.

A plurality of minute branches 194a may be connected to an end of the minute plate branches 195 extending from the transverse stem 193a or the longitudinal stem 192a, and two minute branches 194a may be connected to one minute plate branch 195. The minute plate branches 195 and the minute branches 194a extend in a direction parallel to each other. However, unlike the present exemplary embodiment, a pattern of the first sub-pixel electrode 191a may be changed into a shape in which at least three minute branches 194a are connected to the minute plate branch 195.

A plurality of minute branches 194a may be formed with respect to an open part OP interposed therebetween to form a first region, and a plurality of minute plate branches 195 may be formed with respect to a portion extended from the open part OP formed between minute branches 194a to form a second region.

The minute plate branches 195 will be described in more detail.

An electrode material is filled in the portion of the open part OP disposed between neighboring minute branches 194aa and 194ab, thereby forming the minute plate branch 195. That is, the neighboring minute branches 194aa and 194ab are partially grouped such that a branch having a widened width is formed. The width of the minute plate branch 195 may be about three times the width of the open part OP. In detail, for example, when the width of the minute branches 194aa and 194ab is about 2.2 µm, and the width of the open part OP is about 2.2 µm, the width of the minute plate branch 195 is about 6.6 µm. In the present exemplary embodiment, an electrode pitch may be about 4.4 µm or about 5 µm or about 6 µm. Here, the electrode pitch is a sum of the width of one minute branch 194a and the width of the open part OP neighboring the minute branch 194a. The width of the minute branches 194a and the width of the open part OP forming the electrode pitch may be the same.

Also, the width of the transverse stem 193a or the width of the longitudinal stem 192a may be larger than the minute branches 194a. The width of the transverse stem 193a or the width of the longitudinal stem 192a may be equal to or larger than the electrode pitch at a minimum. When the width of the cross stem is smaller than the electrode pitch, the controllability of liquid crystal control may be decreased in the boundary between neighboring domains.

The portion A of the open part OP disposed between the neighboring minute branches 194aa and 194ab corresponds to the portion extended from the transverse stem 193a or the longitudinal stem 192a such that the minute plate branches 195 formed by filling the electrode material in the portion A of the open part is extended from the transverse stem 193a or the longitudinal stem 192a. At this time, an angle β formed at the portion where the minute branches 194aa and 194ab, the minute plate branch 195, and the open part OP all meet may be about 90 degrees.

The overall shape of the second region where a plurality of minute plate branches 195 are disposed may be a rhombus, and may have upper/lower or right/left symmetry with reference to the cross stem. Also, the overall shape of the second region where a plurality of minute plate branches 195 are disposed may be a square. At this time, when the entire area occupied by the first sub-pixel electrode 191a is referred to as 100%, the area of the minute plate branches 195 except for the open part OP in the second region where the minute plate branches 195 are occupied may be about 10% to about 30%. As a simulation result, as the area of the minute plate branches 195 of the second region is increased from about 10% to about 30%, the transmittance is decreased and a spot margin is increased. In a point of the transmittance and the spot margin, the area of the minute plate branches 195 of the second region may be about 20%.

The minute branches 194a and the minute plate branches 195 constitute an angle of about 45 degrees or 135 degrees with the gate lines 121 or the transverse stem 193a. The minute branches 194a and the minute plate branches 195 constitute an angle of about 45 degrees or about 135 degrees with the gate lines 121 or the transverse stem 193a, thereby enhancing the transmittance. The side visibility is good when forming the angle of about 40 degree out of the angle of 45 degrees, however the side visibility may be enhanced by applying the present exemplary embodiment to a 1G2D structure. The 1G2D structure is a structure in which the gate voltage is applied through one gate line and different data voltages are applied through two data lines to differentiate the electric field formed to two sub-pixel electrodes for ensuring the lateral visibility. In other words, one pixel area is driven by using two thin film transistors.

Also, the extending directions of the minute branches 194a of two neighboring sub-regions Da, Db, Dc, and Dd or the extending directions of minute plate branches 195 may be orthogonal to each other.

At the right and left edge portions of the first sub-pixel electrode 191a, one end of each of the minute branches 194a is connected to the other ends of the minute branches 194a by an edge pattern 450. The edge pattern 450 has a function of preventing instability of the liquid crystal control of the end portion of the minute branches 194a by a field generated by the data lines 171a and 171b adjacent to the end of the minute branches 194a. The edge pattern 450 is disposed substantially parallel to the data lines 171a and 171b. However, the arrangement of the edge pattern 450 is not limited thereto, and edge patterns (not shown) connected to one end of each of the minute branches 194a may be formed in the upper and lower edge portions of the first sub-pixel electrode 191a as well as the right and left edge portions of the first sub-pixel electrode 191a. Also, an edge pattern (not shown) connected to one end of each of the minute branches 194a in two or three neighboring edge portions may be formed, and in the present exemplary embodiment, the edge pattern may be omitted in the upper and lower edge portions as well as the right and left edge portions.

A lower protrusion 197a extending from the lower end of the longitudinal stem 192a overlaps the expansion of the first drain electrode 175a. Accordingly, the longitudinal stem 192a and the first drain electrode 175a may be connected through the first contact hole 185a, and as a result, the voltage transmitted through the first drain electrode 175a may be applied to the first sub-pixel electrode 191a.

The first sub-pixel electrode 191a according to the present exemplary embodiment has been described with reference to the minute branches 194a or the minute plate branches 195. However, the first sub-pixel electrode 191a may be described with respect to the open part OP.

The open part OP includes a first region including a plurality of first open parts connected to the cross stem and a second region including a plurality of second open parts separated from the cross stem and disposed at the edge portion of the first sub-pixel electrode 191a. The first region including a plurality of the first open parts corresponds to the second region where a plurality of the above-described minute plate branches 195 are disposed, and the second region including a plurality of the second open parts corresponds to the first region where the minute branches 194a are disposed. At this time, the interval between the first open parts is larger than the interval between the second open parts.

Also, the extending directions of the first open parts and the extending direction of the second open parts are parallel to each other.

Next, the second sub-pixel electrode 191b will be described.

Again referring to FIG. 1, the overall shape of the second sub-pixel electrode 191b is a quadrangle, and includes a cross stem having a longitudinal stem 192b and a transverse stem 193b crossing the longitudinal stem 192b like the first sub-pixel electrode 191a. Also, like the first sub-pixel electrode 191a, the second sub-pixel electrode 191b is divided into four sub-regions by the transverse stem 193b and the longitudinal stem 192b, and each sub-region includes a plurality of minute branches 194b extending in oblique directions.

However, in the entire pixel electrode 191, the area occupied by the second sub-pixel electrode 191b may be larger than the area occupied with by first sub-pixel electrode 191a, and the area of the second sub-pixel electrode 191b may be 1.0 to 2.2 times the area of the first sub-pixel electrode 191a.

Also, in some embodiments, unlike the first sub-pixel electrode 191a, the second sub-pixel electrode 191b does not include the minute plate branches 195, and a plurality of minute branches 194b occupy most of the second sub-pixel electrode 191b except for the cross stem.

Also, unlike the first sub-pixel electrode 191a, one end of each of the minute branches 194b is not connected to the right and left edge portions of the second sub-pixel electrode 191b. In other words, the edge pattern 450 disposed at the right and left edge portions of the first sub-pixel electrode 191a is not formed in the second sub-pixel electrode 191b. Also, at the right and left edge portions of the second sub-pixel electrode 191b, one end of each of the minute branches 194b overlaps the data lines 171a and 171b.

The transverse stem 193b and the longitudinal stem 192b of the second sub-pixel electrode 191b may have the same different widths. When the widths of the transverse stem 193b and the longitudinal stem 192b are the same, the widths may be about 4 μm to about 7 μm, and when the widths of the transverse stem 193b and the longitudinal stem 192b are different, the width of the transverse stem 193b may be about 7 μm, and the width of the longitudinal stem 192b may be about 5 μm. Here, by differentiating the widths of the transverse stem 193b and the longitudinal stem 192b, the side visibility may be further improved.

The minute branches 194b form an angle of about 45 degrees or 135 degrees with the gate lines 121 or the transverse stem 193. The minute branches 194b form an angle of about 45 degrees or 135 degrees with the gate lines 121 or the transverse stem 193b, thereby enhancing transmittance.

Also, the extending directions of the minute branches 194b of two neighboring sub-regions may be orthogonal to each other.

An upper protrusion 197b extending from the upper portion of the longitudinal stem 192b of the second sub-pixel electrode 191b overlaps the expansion of the second drain electrode 175b. Accordingly, the longitudinal stem 192b and the second drain electrode 175b are connected through the second contact hole 185b, and as a result, the voltage transmitted through the second drain electrode 175b may be applied to the second sub-pixel electrode 191a.

In the above, the second sub-pixel electrode 191b does not include the minute plate branch 195, and a plurality of minute branches 194b occupy most of the second sub-pixel electrode 191b except for the cross stem. However, as another exemplary embodiment, like the pattern of the first sub-pixel electrode 191a of FIG. 1, the pattern of the second sub-pixel electrode 191b may be formed. In other words, as the present exemplary embodiment, the second sub-pixel electrode 191b may be formed of a shape including the minute plate branches like the first sub-pixel electrode 191a described in FIG. 1. In FIG. 1, the description of the first sub-pixel electrode 191a may be applied to the second sub-pixel electrode 191b in the present exemplary embodiment. However, the area occupied by the second sub-pixel electrode 191b is larger than the area occupied by the first sub-pixel electrode 191a such that if the minute plate branches encompass about 20% of the entire sub-pixel electrode area, the area occupied by the minute plate branches may be very much larger in the entire pixel. Accordingly, when the second sub-pixel electrode 191b has the shape including the minute plate branches, the portion occupied by the minute plate branches is less than about 20% in the entire sub-pixel electrode area.

In the above, at the right and left edge portions of the second sub-pixel electrode 191b, one end of each of the minute branches 194b is not connected. However, as another exemplary embodiment, like the edge portion of the first sub-pixel electrode 191a of FIG. 1, the edge pattern may be formed and connected to one end of each of the minute branches 194b at the right and left edge portions of the second sub-pixel electrode 191b.

Hereinafter, the upper panel 200 will be described.

In the upper panel 200, a light blocking member 220 is formed on a transparent and insulating upper substrate 210 which functions as the second substrate.

The light blocking member 220 is referred to as black matrix, and prevents light leakage between the pixel electrodes 191. The light blocking member 220 includes a portion corresponding to the gate line 121 and the data lines 171a and 171b, and a portion corresponding to the thin film transistor.

The light blocking member 220 may be disposed on the lower substrate 110 instead of the upper substrate 210. Here, the light blocking member 220 may be generally disposed between neighboring color filters 230.

An overcoat 250 may be disposed on the light blocking member 220. The overcoat 250 may be made of an insulating material and provides a flat surface. The overcoat 250 may be omitted.

A common electrode 270 is disposed on the overcoat 250. Here, the common electrode 270 may be formed of a plate shape in the pixel area. The plate shape is a plate shape without splitting.

Alignment layers 11 and 21 may be respectively coated on the inner surfaces of the lower panel 100 and the upper panel 200, and they may be a vertical alignment layers.

Polarizers (not shown) may be provided on the outer surfaces of the lower panel 100 and the upper panel 200.

A liquid crystal layer 3 is disposed between the lower panel 100 and the upper panel 200. The liquid crystal layer 3 includes a plurality of liquid crystal molecules 310, and an alignment polymer formed by irradiating light to an alignment aid 50. As another exemplary embodiment, the alignment polymer is not included in the liquid crystal layer 3, and the alignment polymer may be formed in the alignment layers 11 and 21.

The liquid crystal molecules 310 have negative dielectric anisotropy, and may be oriented such that the major axes thereof are almost perpendicular to the surfaces of the two display panels 100 and 200 when no electric field is applied.

If voltages are applied to the pixel electrode 191 and the common electrode 270, the liquid crystal molecules 310 respond to the electric field generated between the pixel electrode 191 and the common electrode 270 such that the long axes thereof tend to be perpendicular to the electric field direction. The degree of polarization of the light incident to the liquid crystal layer 3 is changed according to the inclined angle of the liquid crystal molecules 310, and this change of polarization appears as a change of transmittance by the polarizer, thereby displaying images of the liquid crystal display.

The direction of inclination of the liquid crystal molecules 310 is determined by the minute branches 194a of the pixel electrodes 191, and the liquid crystal molecules 310 are inclined in the direction parallel to the length direction of the minute branches 194a. One pixel electrode 191 includes four sub-regions Da, Db, Dc, and Dd having different length directions of the minute branches 194a such that the direction of inclination of the liquid crystal molecules 310 is about four directions and the liquid crystal layer 3 includes four domains having different alignment directions of the liquid crystal molecules 310. Therefore, the viewing angle of the liquid crystal display is widened by varying the directions of inclination of the liquid crystal molecules 310.

The alignment polymer formed by the polymerization of the alignment aid 50 has a function of controlling a pre-tilt as an initial alignment direction of the liquid crystal molecules 310. The alignment aid 50 may be a reactive mesogen.

The alignment aid 50 has a similar shape to the liquid crystal molecules 310, and includes a core group forming a core axis and a terminal group connected thereto.

The alignment aid 50 may be included in the alignment layers 11 and 21, unlike the present exemplary embodiment.

Figure 4:
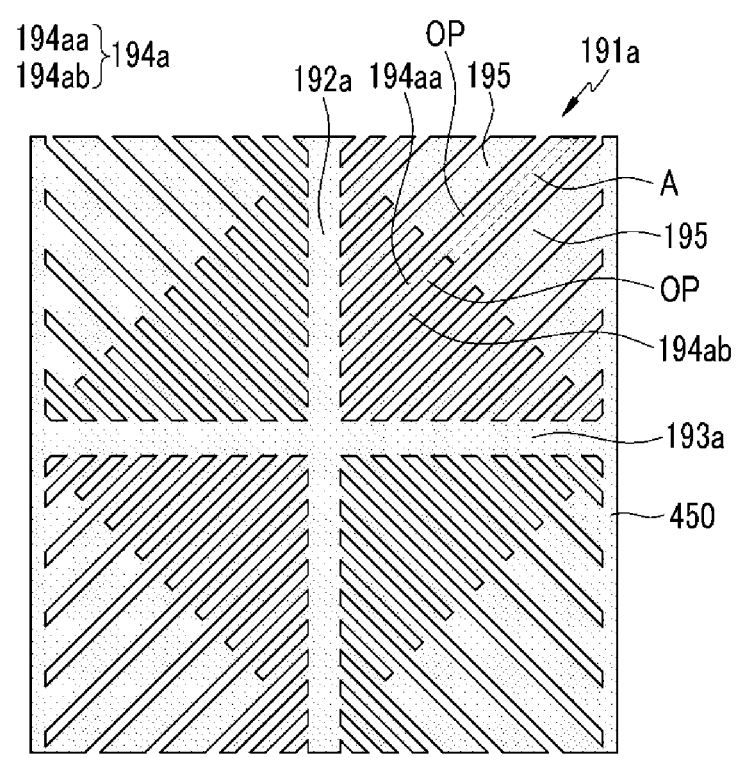
FIG. 4 is a top plan view of a pattern of one sub-pixel electrode according to another exemplary embodiment of the present invention.

FIG. 4 is a top plan view of a pattern of one sub-pixel electrode according to another exemplary embodiment of the present invention.

Referring to FIG. 4, like the pattern of the sub-pixel electrode of FIG. 3, the overall shape of the first sub-pixel electrode 191a is a quadrangle and includes a cross stem including a longitudinal stem 192a and a transverse stem 193a intersecting it. Also, the first sub-pixel electrode 191a is divided into a first sub-region Da, a second sub-region Db, a third sub-region Dc, and a fourth sub-region Dd by the transverse stem 193a and the longitudinal stem 192a. Each of the sub-regions Da, Db, Dc, and Dd includes a plurality of minute branches 194a and a plurality of minute plate branches 195 extending in oblique directions.

However, the position of the minute branches 194a and the minute plate branches 195 is different from that described in FIG. 3. In detail, in the present exemplary embodiment, the minute branches 194a extend from the transverse stem 193a or the longitudinal stem 192a, and the minute plate branches 195 are connected to the ends of the minute branches 194a. That is, the minute branches 194a are arranged at the center portion near the cross stem, and the minute plate branches 195 are arranged along the edge portion of the first sub-pixel electrode 191a.

The overall shape of the minute branches 194a is a rhombus, and may have upper and lower or right and left symmetry with reference to the cross stem. Also, the minute branches 194a may form a square. The overall shape of the first sub-pixel electrode 191a is a quadrangle. The first sub-pixel electrode 191a includes a first region where the minute branches 194a are disposed and a second region where the minute plate branches 195 are disposed. The second region where the minute plate branches 195 are disposed is substantially equal to a portion excluding the shape of the first region from the quadrangle shape of the first sub-pixel electrode 191a.

At the right and left edge portions of the first sub-pixel electrode 191a, one end of each of the minute plate branches 195 is connected to the other minute plate branches 195 by the edge pattern 450.

Except for the above differences, the description in FIG. 3 may be applied to the exemplary embodiment of FIG. 4.

Figure 5:
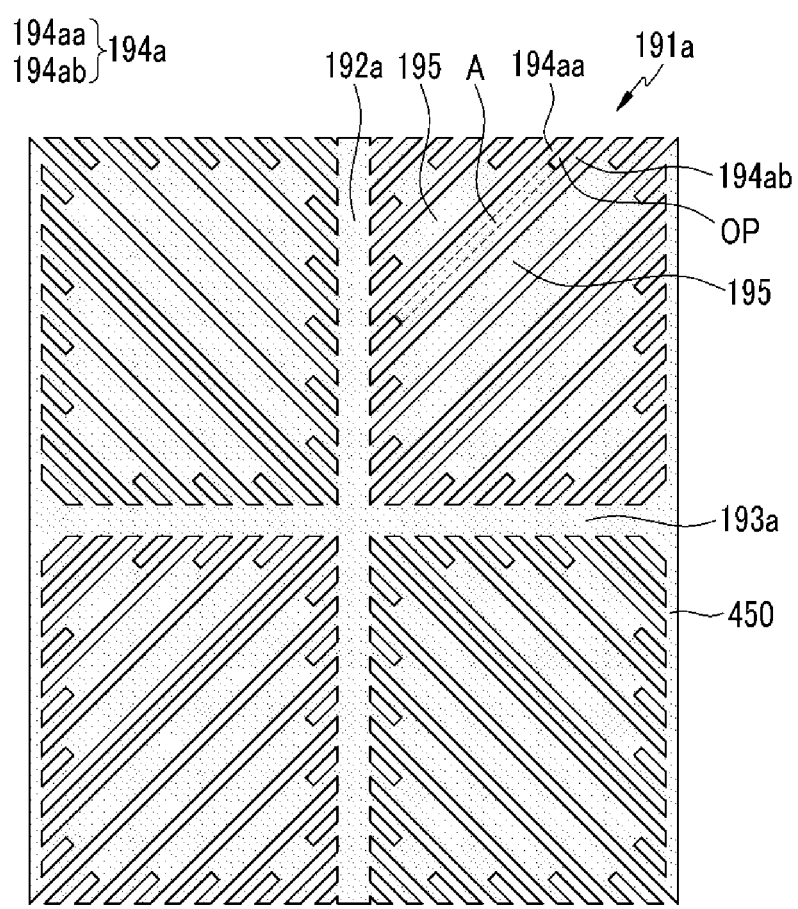
FIG. 5 is a top plan view of a pattern of one sub-pixel electrode according to another exemplary embodiment of the present invention.

FIG. 5 is a top plan view of a pattern of one sub-pixel electrode according to another exemplary embodiment of the present invention.

Referring to FIG. 5, like the pattern of the sub-pixel electrode described in FIG. 3 and FIG. 4, the overall shape of the first sub-pixel electrode 191a is a quadrangle and includes a cross stem having a longitudinal stem 192a and a transverse stem 193a crossing the longitudinal stem 192a. Also, the first sub-pixel electrode 191a is divided into a first sub-region Da, a second sub-region Db, a third sub-region Dc, and a fourth sub-region Dd by the transverse stem 193a and the longitudinal stem 192a, and each of the sub-regions Da, Db, Dc, and Dd includes a plurality of minute branches 194a and a plurality of minute plate branches 195 extending in oblique directions.

However, the positions of the minute branches 194a and the minute plate branches 195 are different from those of FIG. 3 and FIG. 4. In detail, in the present exemplary embodiment, some minute branches 194a extend from the transverse stem 193a or the longitudinal stem 192a, and also the other portion extends from the edge of the first sub-pixel electrode 191a toward the cross stem. The portion of the minute branches 194a extending from the transverse stem 193a or the longitudinal stem 192a and the other portion of the minute branches 194a extending from the edge of the first sub-pixel electrode 191a toward the cross stem may be disposed on the same straight line.

The minute plate branches 195 disposed between a portion of the minute branches 194a and the other portion of the minute branches 194a, and one end of the minute plate branches 195 are connected to the end of the portion of the minute branches 194a and the other end of the minute plate branches 195 are connected to the end of the other portion of the minute branches 194a. That is, the minute branches 194a are arranged at the center portion near the cross stem, and are also arranged along the edge portion of the first sub-pixel electrode 191a.

At the right and left edge portions of the first sub-pixel electrode 191a, one end of each of the minute branches 194a is connected to the other ends of the minute branches 194a by the edge pattern 450.

Except for the above differences, the description in FIG. 3 may be applied to the exemplary embodiment of FIG. 5.

Figure 6:
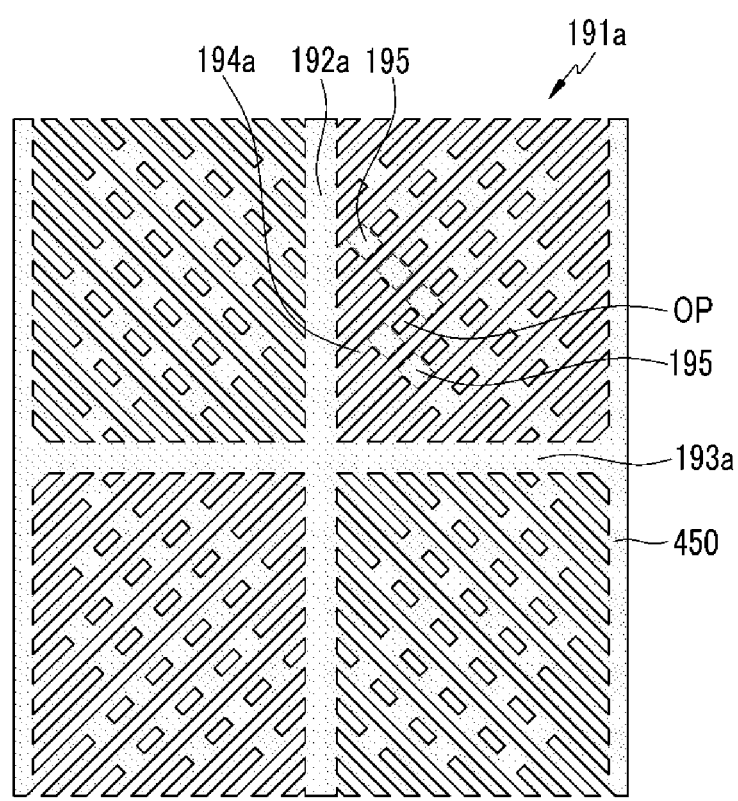
FIG. 6 is a top plan view of a pattern of one sub-pixel electrode according to another exemplary embodiment of the present invention.

FIG. 6 is a top plan view of a pattern of one sub-pixel electrode according to another exemplary embodiment of the present invention.

Referring to FIG. 6, like the pattern of the sub-pixel electrode described in FIG. 5, the overall shape of the first sub-pixel electrode 191a is a quadrangle and includes a cross stem having a longitudinal stem 192a and a transverse stem 193a crossing the longitudinal stem 192a. Also, the first sub-pixel electrode 191a is divided into a first sub-region Da, a second sub-region Db, a third sub-region Dc, and a fourth sub-region Dd by the transverse stem 193a and the longitudinal stem 192a, and each of the sub-regions Da, Db, Dc, and Dd include a plurality of minute branches 194a and a plurality of minute plate branches 195 extending in the oblique directions.

However, in the exemplary embodiment of FIG. 6, the minute plate branches 195 are shaped such that one minute plate branch 195 described in FIG. 5 is divided into several parts. In detail, in the present exemplary embodiment, a plurality of minute plate branches 195 are arranged in columns with substantially uniform widths along a direction intersecting the extending direction of the minute branches 194a. The extending direction of the minute branches 194a and the direction intersecting thereto may be perpendicular to each other. Also, a group of a plurality of minute plate branches 195 arranged in columns are formed in plural, and a plurality of groups of a plurality of minute plate branches 195 are approximately separated by the width of the minute plate branches 195. With reference to the extending direction of the minute branches 194a, minute plate branches 194a arranged on one straight line in the direction that the minute branch 194a extends are separated from each other thereby forming a plurality of plate portions.

Figure 7:
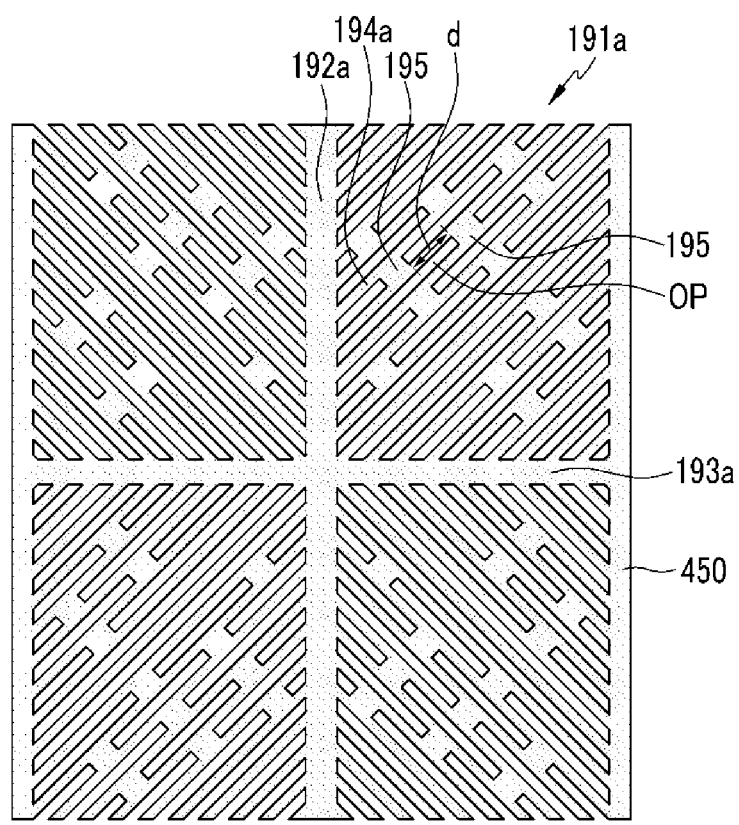
FIG. 7 is a top plan view of a pattern of one sub-pixel electrode according to another exemplary embodiment of the present invention.

FIG. 7 is a top plan view of a pattern of one sub-pixel electrode according to another exemplary embodiment of the present invention.

Referring to FIG. 7, like the pattern of the sub-pixel electrode described in FIG. 6, the overall shape of the first sub-pixel electrode 191a is a quadrangle and includes a cross stem having a longitudinal stem 192a and a transverse stem 193a crossing the longitudinal stem 192a. Also, the first sub-pixel electrode 191a is divided into a first sub-region Da, a second sub-region Db, a third sub-region Dc, and a fourth sub-region Dd by the transverse stem 193a and the longitudinal stem 192a, and each of the sub-regions Da, Db, Dc, and Dd includes a plurality of minute branches 194a and a plurality of minute plate branches 195 extending in oblique directions.

Also, like the exemplary embodiment in FIG. 6, a plurality of minute plate branches 195 are arranged in columns with substantially uniform widths along a direction intersecting the extending direction of the minute branches 194a. The extending direction of the minute branches 194a and the direction intersecting thereto may be perpendicular to each other. However, a separation distance d between the minute plate branches 195 neighboring along the extending direction of the minute branches 194a is larger than the case of the exemplary embodiment of FIG. 6. In detail, the separation distance d between the minute plate branches 195 may be larger than the width of the minute plate branches 195 in the direction that a plurality of minute plate branches 195 are arranged in columns.

Figure 8:
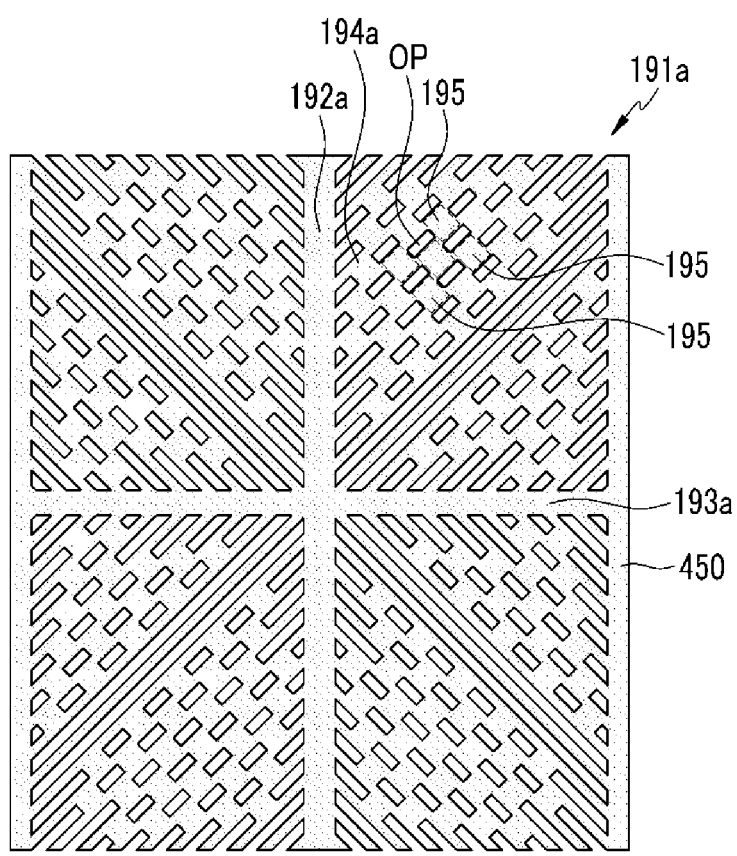
FIG. 8 is a top plan view of a pattern of one sub-pixel electrode according to another exemplary embodiment of the present invention.

FIG. 8 is a top plan view of a pattern of one sub-pixel electrode according to another exemplary embodiment of the present invention.

Referring to FIG. 8, like the pattern of the sub-pixel electrode described in FIG. 6, the overall shape of the first sub-pixel electrode 191a is a quadrangle and includes a cross stem having a longitudinal stem 192a and a transverse stem 193a crossing the longitudinal stem 192a. Also, the first sub-pixel electrode 191a is divided into a first sub-region Da, a second sub-region Db, a third sub-region Dc, and a fourth sub-region Dd by the transverse stem 193a and the longitudinal stem 192a, and each of the sub-regions Da, Db, Dc, and Dd include a plurality of minute branches 194a and a plurality of minute plate branches 195 extending in oblique directions.

Also, like the exemplary embodiment in FIG. 6, a plurality of minute plate branches 195 are arranged in columns with substantially uniform widths along a direction intersecting the extending direction of the minute branches 194a. The extending direction of the minute branches 194a and the direction intersecting thereto may be perpendicular to each other. Also, a group of a plurality of minute plate branches 195 are arranged in columns in plural.

However, unlike the arrangement of the group of a plurality of minute plate branches 195 in FIG. 6, in the present exemplary embodiment, a plurality of groups of a plurality of minute plate branches 195 neighbor each other and are arranged to cross each other. The neighboring groups of a plurality of minute plate branches 195 are connected in the crossed arrangement state.

Figure 9:
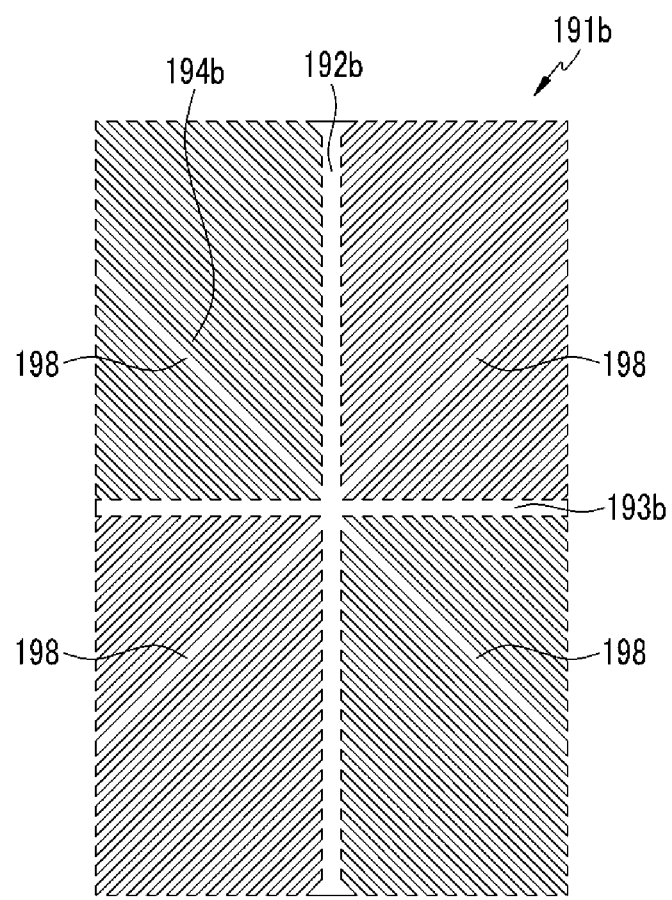
FIG. 9 is a top plan view of a pattern of one sub-pixel electrode according to another exemplary embodiment of the present invention.

FIG. 9 is a top plan view of a pattern of one sub-pixel electrode according to another exemplary embodiment of the present invention.

Referring to FIG. 9, like the pattern of the second sub-pixel electrode 191b described in FIG. 1, the overall shape of the first sub-pixel electrode 191a is a quadrangle and includes a cross stem having a longitudinal stem 192a and a transverse stem 193a crossing the longitudinal stem 192a. Also, the second sub-pixel electrode 191b according to the present exemplary embodiment is divided into four sub-regions by the transverse stem 193b and the longitudinal stem 192b, and each sub-region includes a plurality of minute branches 194b extending in the oblique directions.

However, the second sub-pixel electrode 191b according to the present exemplary embodiment includes an X bar 198 extending in four directions from a portion where the transverse stem 193b and the longitudinal stem 192b are crossed to the edge of the second sub-pixel electrode 191b and having an "X" shape. The X bar 198 is substantially parallel to the minute branches 194b.

While the cross stem should have a certain thickness to effectively control the texture, thinner cross stem is advantageous in an aspect of transmittance efficiency. In the present exemplary embodiment, the thickness of the cross stem is reduced to ensure the transmittance whereas a thicker X bar 198 than the minute branches 194b is formed to compensate the texture control. The X bar 198 is substantially parallel to the minute branches 194b thereby forming the same angle with the cross stem. Accordingly, the transmittance deterioration by the X bar 198 may be reduced.

Figure 10:
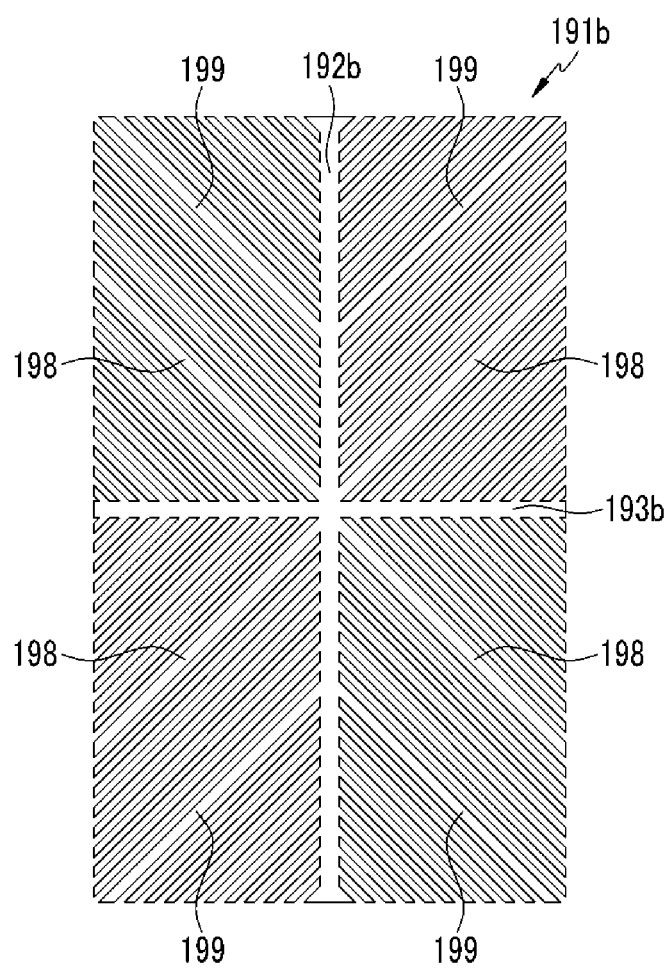
FIG. 10 is a top plan view of a pattern of one sub-pixel electrode according to another exemplary embodiment of the present invention.

FIG. 10 is a top plan view of a pattern of one sub-pixel electrode according to another exemplary embodiment of the present invention.

FIG. 10 is the same as most of the pattern of the second sub-pixel electrode 191b described in FIG. 9, however another set of X bars 199 are added, in addition to four X bars 198, to form a set of dummy bars 199. The dummy bars 199 extend in four directions from the longitudinal stem 192b to the edge of the second sub-pixel electrode 191b. The dummy bars 199 are substantially parallel to the X bar 198.

The dummy bars 199 and the X bar 198 may have a line width. However, the positions where the X bar 198 and the dummy bars 199 are connected to the cross stem and the positions in the outer part of the second sub-pixel electrode 191b are different from each other such that differences of controllability of the liquid crystal may be generated. Accordingly, for the optimization and the enhancement of the control of the liquid crystal, the dummy bars 199 and the X bar 198 may have different line widths. At this time, the line width of the dummy bars 199 and the X bar 198 is larger than the width of the minute branches 194b.

Figure 11:
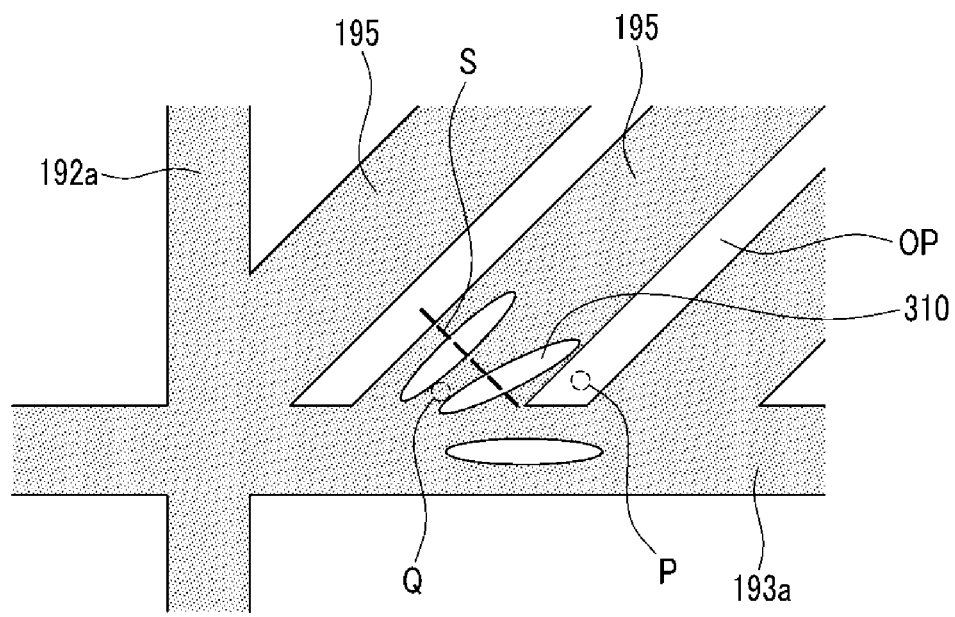
FIG. 11 is a top plan view schematically showing a liquid crystal arrangement of a portion where a longitudinal stem and a transverse stem intersect in the exemplary embodiment of FIG. 1.

FIG. 11 is a top plan view schematically showing a liquid crystal arrangement of a portion where a longitudinal stem and a transverse stem intersect in the exemplary embodiment of FIG. 1.

Referring to FIG. 11, in a typical structure in which only a minute branch 194a is formed, a slit is opened at the first position P and the second position Q such that right and left electric fields along the first axis s direction are symmetrical. However, in the exemplary embodiment of FIG. 1, the slit of the second position Q is removed such that right and left balance is broken to reduce the controllability on the liquid crystal 310, and thus the texture may extend inside the electrode.

Figure 12:
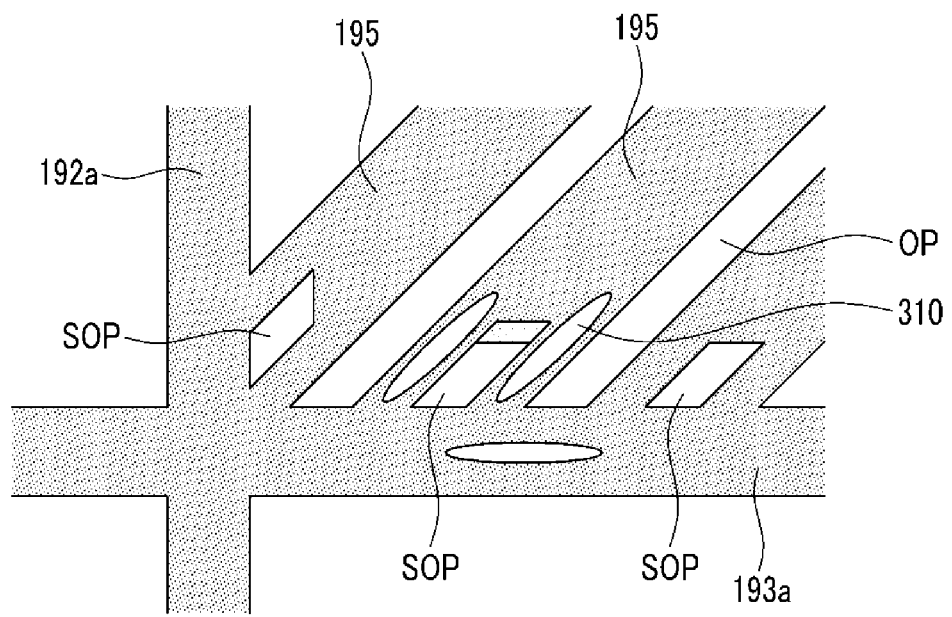
FIG. 12 is a top plan view schematically showing an electrode pattern of a portion where a longitudinal stem and a transverse stem intersect in a liquid crystal display according to another exemplary embodiment of the present invention.

To improve this, in the exemplary embodiment described in FIG. 12, the dummy open part SOP is formed inside the minute plate branch 195 near the cross stem. Hereinafter, the dummy open part SOP will be described with reference to FIG. 12 and FIG. 13.

Figure 13:
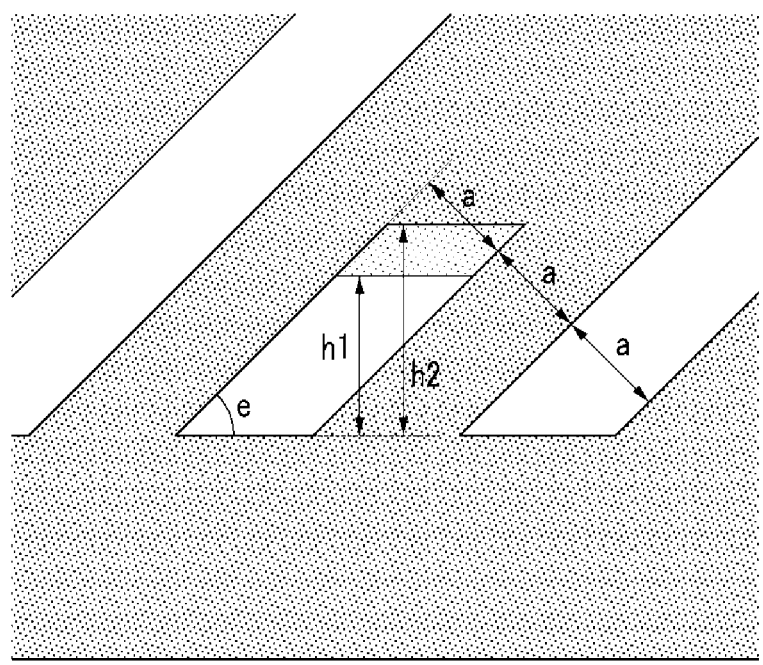
FIG. 13 is an enlarged view showing a portion of an electrode pattern according to the exemplary embodiment of FIG. 12.

FIG. 12 is a top plan view schematically showing an electrode pattern of a portion where a longitudinal stem and a transverse stem intersect in a liquid crystal display according to another exemplary embodiment of the present invention. FIG. 13 is an enlarged view showing a portion of an electrode pattern according to the exemplary embodiment of FIG. 12.

Referring to FIG. 12 and FIG. 13, the dummy open part SOP is formed inside the minute plate branch 195 neighboring the longitudinal stem 192a and the transverse stem 193a. The dummy open part SOP is disposed at the end of the minute plate branch 195 which is connected to the cross stem, and may divide the end of minute plate branch 195 into two branches. The width of the dummy open part SOP may be the substantially the same as the width of the open part OP.

In the present exemplary embodiment, the shape of the dummy open part SOP may be a parallelogram. When the width of the minute plate branch 195 may be about three times the width of the open part OP, as shown in FIG. 13, the width of the dummy open part SOP and the width of the branches divided by the dummy open part SOP may be all referred to as a, and the height of the dummy open part SOP may satisfy the following condition 1. Here, the angle e between two edges of the parallelogram is about 45 degrees.

$$h \leq 3*\sqrt{2}*a/2 \qquad \text{condition 1}$$

Here, the height when the height h of the open part SOP is $3*\sqrt{2}*a/2$ is denoted as the second height h2 in FIG. 13. If the height h of the open part SOP is larger than the second height h2, the effect of increasing a spot margin by forming the minute plate branch 195 may be diminished.

In the present exemplary embodiment, the height h of the dummy open part SOP may additionally satisfy the condition 2 below.

$$\sqrt{2}*a \leq h \qquad \text{condition 2}$$

Here, the height when the height h of the open part SOP is $\sqrt{2}*a$ is denoted as the first height h1 in FIG. 13. If the height h of the open part SOP is less than the first height h1, the effect of increasing the texture controllability in the cross stem by forming the dummy open part SOP may be diminished.

Accordingly, in order to appropriately control the overall texture and the texture in the cross stem at the same time, the range satisfying both the condition 1 and the condition 2 may be picked up for better result.

If this condition is satisfied, the texture near the cross stem may be controlled while the texture controllability in the entire pixel area by the minute plate branch 195 is increased.

Figure 14:
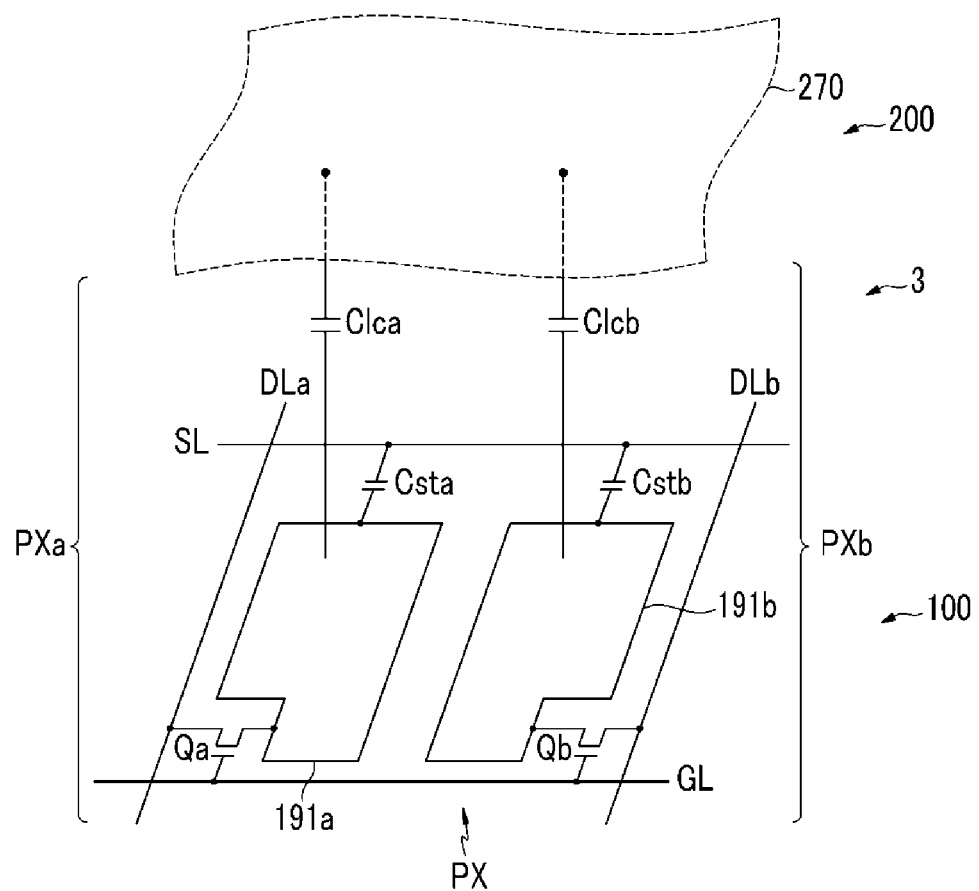
FIG. 14 is an equivalent circuit diagram for a pixel of the liquid crystal display according to the exemplary embodiment of FIG. 1.

FIG. 14 is an equivalent circuit diagram for a pixel of the liquid crystal display according to the exemplary embodiment of FIG. 1.

Referring to FIG. 14, a liquid crystal display according to an exemplary embodiment of the present invention includes a thin film transistor array panel 100 and a common electrode panel 200 facing each other, and a liquid crystal layer 3 interposed therebetween.

The liquid crystal display includes signal lines including a plurality of gate lines GL, a plurality of pairs of data lines DLa and DLb, and a plurality of storage electrode lines SL, and a plurality of pixels PX connected thereto.

The respective pixels PX include a pair of sub-pixels PXa and PXb, and each sub-pixel PXa/PXb includes a switching element Qa/Qb, a liquid crystal capacitor Clca/Clcb, and a storage capacitor Csta/Cstb.

Each switching element Qa/Qb is a three-terminal element such as a thin film transistor provided on the lower panel 100, and includes a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb uses a sub-pixel electrode 191a/191b and a common electrode 270 as two terminals. The liquid crystal layer 3 between the electrodes 191a/191b and 270 functions as a dielectric material.

The storage capacitor Csta/Cstb, which helps the function of the liquid crystal capacitor Clca/Clcb, is formed as a storage electrode line SL provided on the panel 100 and a sub-pixel electrode 191a/191b overlapped with an insulator interposed therebetween, and a predetermined voltage such as the common voltage Vcom is applied thereto.

The voltages charged at the two liquid crystal capacitors Clca and Clcb are established to slightly differ from each other. For example, the data voltage applied to the liquid crystal capacitor Clca may be established to be always lower or higher than the data voltage applied to the other liquid crystal capacitor Clcb. When the voltages of the two liquid crystal capacitors Clca and Clcb are properly controlled, an image viewed from the lateral side excellently approximates an image viewed from the frontal side, thereby improving the side visibility of the liquid crystal display.

Figure 15:
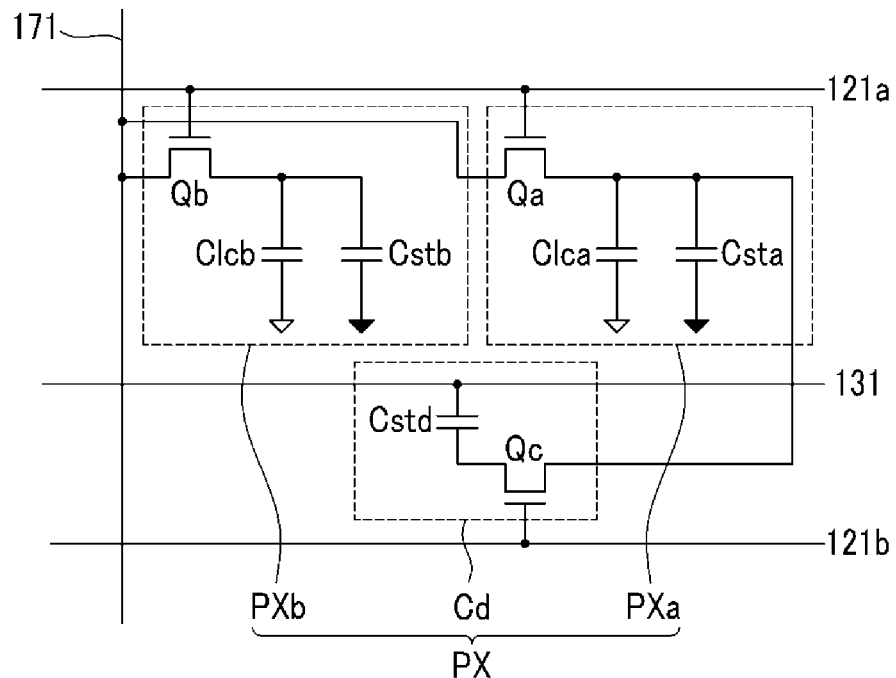
FIG. 15 is an equivalent circuit diagram of a pixel of a liquid crystal display according to another exemplary embodiment of the present invention.

FIG. 15 is an equivalent circuit diagram of a pixel of a liquid crystal display according to another exemplary embodiment of the present invention.

Referring to FIG. 15, a liquid crystal display according to an exemplary embodiment of the present invention includes signal lines including a gate line 121a, a step-down gate line 121b, a storage electrode line 131, and a data line 171, and a pixel PX connected thereto.

The pixel PX includes the first sub-pixel PXa, the second sub-pixel PXb, and a step-down unit Cd.

The first sub-pixel PXa includes the first switching element Qa, the first liquid crystal capacitor Clca, and the first storage capacitor Csta. The second sub-pixel PXb includes the second switching element Qb, the second liquid crystal capacitor Clcb, and the second storage capacitor Cstb. The step-down unit Cd includes the third switching element Qc and the step-down capacitor Cstd.

The first and second switching elements Qa and Qb are each a three terminal element such as a thin film transistor that is provided in the lower display panel 100, the control terminal thereof is connected to the gate line 121a, the input terminal is connected to the data line 171, and the output terminal is connected to the first and second liquid crystal capacitors Clca and Clcb and the first and second storage capacitors Csta and Cstb.

The third switching element Qc is a three terminal element such as a thin film transistor that is provided in the lower display panel 100, the control terminal is connected to the step-down gate line 121b, the input terminal is connected to the first liquid crystal capacitor Clca, and the output terminal is connected to the step-down capacitor Cstd.

The first and second liquid crystal capacitors Clca and Clcb are respectively formed by overlapping the first and second sub-pixel electrodes 191a and 191b connected to the first and second switching elements Qa and Qb and the common electrode of the upper panel. The first and second storage capacitors Csta and Cstb are respectively formed by overlapping the storage electrode line 131 and the first and second sub-pixel electrodes 191a and 191b.

The step-down capacitor Cstd is connected to the output terminal of the third switching element Qc and the storage electrode line 131, and is formed by overlapping the storage electrode line 131 of the lower panel and the output terminal of the third switching element Qc via an insulator interposed therebetween.

An operation of the liquid crystal display in the present exemplary embodiment will be described.

Firstly, if the first gate line 121a is applied with the gate-on voltage Von, the first and second thin film transistors Qa and Qb connected thereto are turned on.

Accordingly, the data voltage applied to the data line 171b is equally applied to the first and second sub-pixel electrodes 191a and 191b through the turned-on first and second switching elements Qa and Qb. The first and second liquid crystal capacitors Clca and Clcb are charged by a voltage difference between the common voltage Vcom of the common electrode 270 and the voltages of the first and second sub-pixel electrodes 191a and 191b, respectively, such that the charging voltage of the first liquid crystal capacitor Clca is the same as the charging voltage of the second liquid crystal capacitor Clcb. Here, the second gate line 121b is applied with the gate-off voltage Voff.

Next, if the first gate line 121a is applied with the gate-off voltage Voff when the second gate line 121b is applied with the gate-on voltage Von, the first and second switching elements Qa and Qb connected to the first gate line 121a are turned off, and the third switching element Qc is turned on. Accordingly, the charges of the first sub-pixel electrode 191a connected to the output terminal of the first switching element Qa flow to the step-down capacitor Cstd such that the voltage of the first liquid crystal capacitor Clca is decreased.

It is assumed that the liquid crystal display according to the present exemplary embodiment is driven by frame inversion and that the data voltage of the positive polarity with reference to the common voltage Vcom is applied to the data line 171 in the current frame, so the negative charges are gathered at the step-down capacitor Cstd after the previous frame is finished. If the third switching element Qc is turned on in the current frame, the positive charges of the first sub-pixel electrode 191a flow to the step-down capacitor Cstd through the third switching element Qc such that the positive charges are gathered at the step-down capacitor Cstd and the voltage of the first liquid crystal capacitor Clca is decreased. In the next frame, in contrast, the negative charges are charged to the first sub-pixel electrode 191a, and as the third switching element Qc is turned on, the negative charges of the first sub-pixel electrode 191a flow into the step-down capacitor Cstd such that the negative charges are gathered at the step-down capacitor Cstd and the voltage of the first liquid crystal capacitor Clca is also decreased.

As described above, according to the present exemplary embodiment, the charging voltage of the first liquid crystal capacitor Clca is lower than the charging voltage of the second liquid crystal capacitor Clcb regardless of the polarity of the data voltage. Accordingly, the charging voltages of the first and second liquid crystal capacitors Clca and Clcb are different such that the lateral view of the liquid crystal display may be improved.

Figure 16:
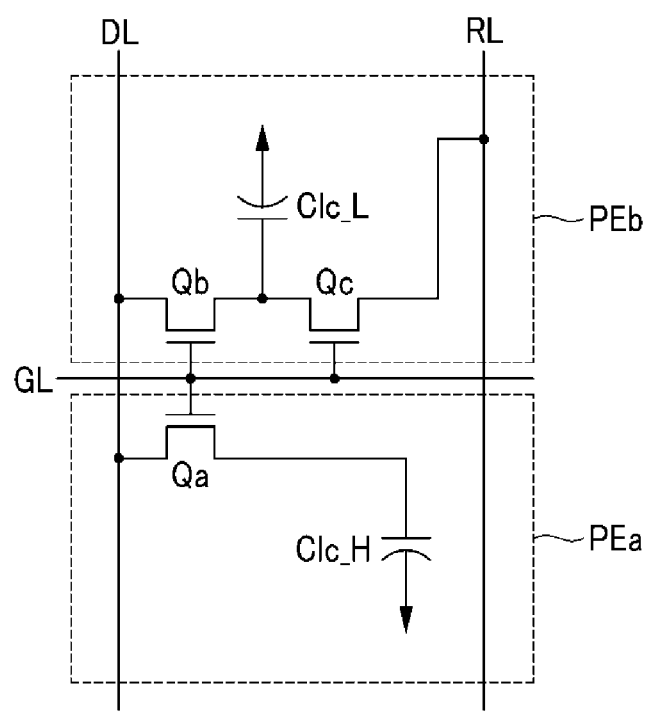
FIG. 16 is an equivalent circuit diagram of a pixel of a liquid crystal display according to another exemplary embodiment of the present invention.
Figure 17:
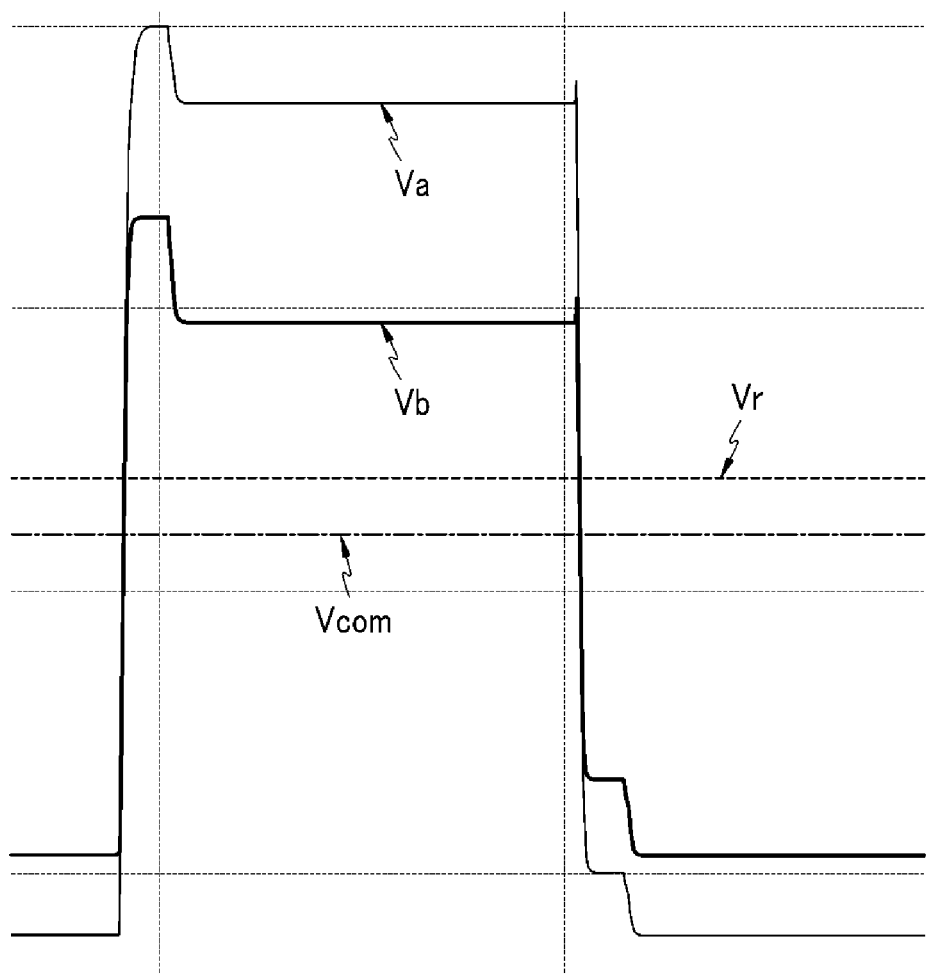
FIG. 17 is a waveform diagram of a signal applied to a pixel of the liquid crystal display according to the exemplary embodiment of FIG. 16.

FIG. 16 is an equivalent circuit diagram of a pixel of a liquid crystal display according to another exemplary embodiment of the present invention. FIG. 17 is a waveform diagram of a signal applied to a pixel of the liquid crystal display according to the exemplary embodiment of FIG. 16.

Referring to FIG. 16, one pixel PX of the liquid crystal display according to the exemplary embodiment of the present invention includes a plurality of signal lines including a gate line GL transmitting a gate signal, a data line DL transmitting a data signal, and a reference voltage line RL transmitting a divided reference voltage, and a first switching element Qa, a second switching element Qb, a third switching element Qc, a first liquid crystal capacitor Clca, and a second liquid crystal capacitor Clcb which are connected to the plurality of signal lines.

The first switching element Qa and the second switching element Qb are respectively connected to the gate line GL and the data line DL, and the third switching element Qc is connected to the output terminal of the second switching element Qb and a reference voltage line RL.

The first switching element Qa and the second switching element Qb are three-terminal elements of the thin film transistor, and control terminals thereof are connected to the gate line GL, input terminals are connected to the data line DL, an output terminal of the first switching element Qa is connected to the first liquid crystal capacitor Clca, and an output terminal of the second switching element Qb is connected to input terminals of the second liquid crystal capacitor Clcb and the third switching element Qc.

The third switching element Qc is also a three-terminal element of the thin film transistor, and a control terminal thereof is connected to the gate line GL, an input terminal is connected to the second liquid crystal capacitor Clcb, and an output terminal is connected to the reference voltage line RL.

Referring to FIG. 17, when a gate on Von signal is applied to the gate line GL, the first switching element Qa, the second switching element Qb, and the third switching element Qc that are connected thereto are turned on. Accordingly, the data voltage applied to the data line DL is separately applied to a first electrode PEa and a second electrode PEb through the first switching element Qa and the second switching element Qb that are turned on. In this case, the data voltages applied to the first electrode PEa and the second electrode PEb may be charged at the same value. However, according to the exemplary embodiment of the present invention, the voltage applied to the second electrode PEb is divided through the third switching element Qc connected with the second switching element Qb in series. Accordingly, the voltage Vb applied to the second electrode PEb is smaller than the voltage Va applied to the first electrode PEa.

As a result, the voltage charged to the first liquid crystal capacitor Clca and the voltage charged to the second liquid crystal capacitor Clcb are different from each other. The voltage charged to the first liquid crystal capacitor Clca and the voltage charged to the second liquid crystal capacitor Clcb are different from each other such that the inclined angles of the liquid crystal molecules are different in the first sub-pixel and the second sub-pixel, thereby changing the luminance of the two sub-pixels. Therefore, when the charging voltages of the first and second liquid crystal capacitors Clca and Clcb are appropriately adjusted, it is possible to make an image viewed from the side be as similar as possible to an image viewed from the front, and as a result it is possible to improve the side visibility.

The liquid crystal display according to the exemplary embodiment of FIG. 15, FIG. 16, and FIG. 17 includes the thin film transistor of a 1G1D structure. The thin film transistor having the 1G1D structure may be varied and applied in the above-described exemplary embodiment by replacing the thin film transistor of the 1G2D structure.

Figure 18:
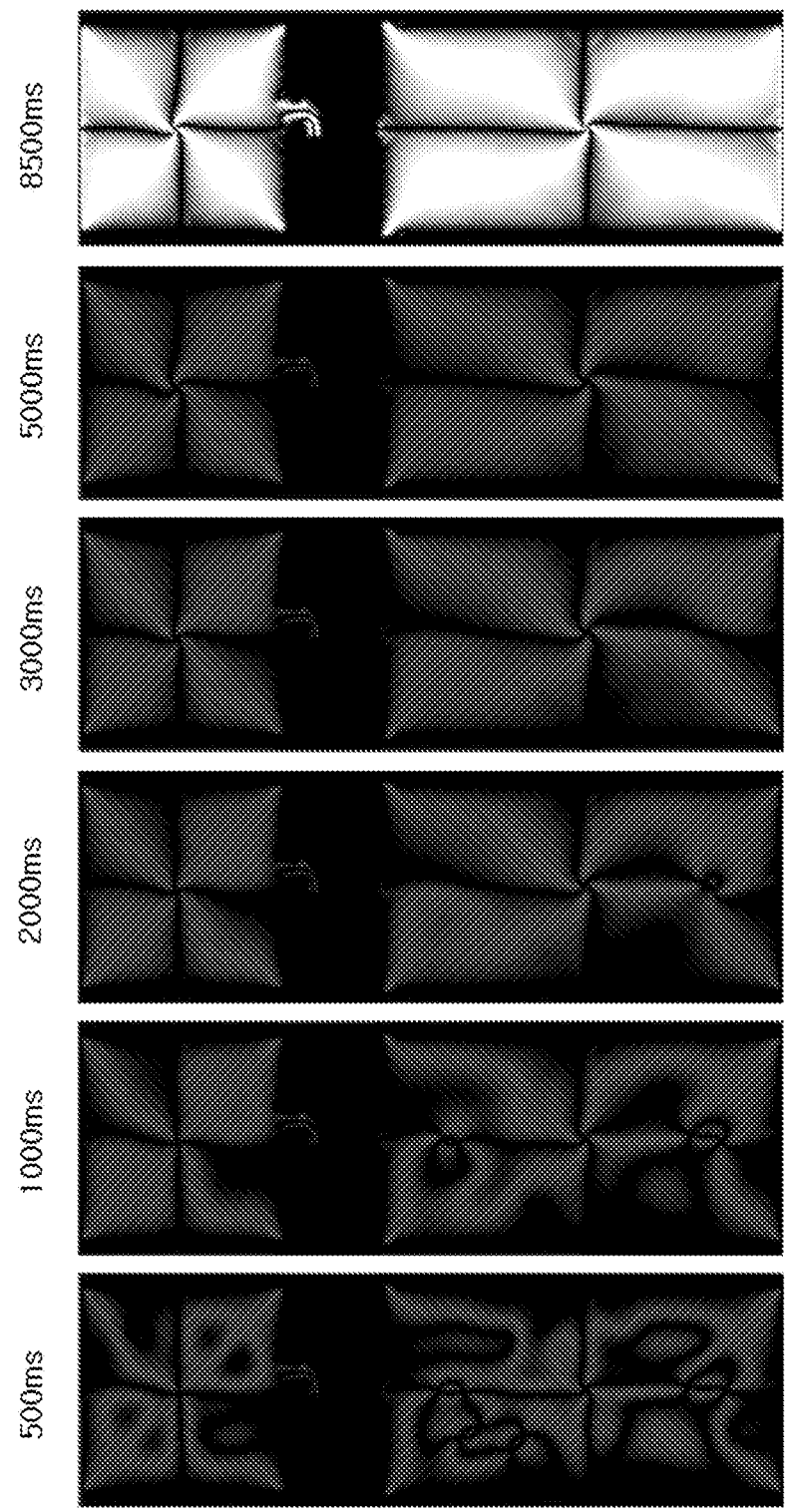
FIG. 18 is a photo of a case that a liquid crystal display according to a comparative example of the present invention is driven.

FIG. 18 is a photo of a case that a liquid crystal display according to a comparative example of the present invention is driven.

The liquid crystal display of FIG. 18 includes the sub-pixel electrode pattern only made of a plurality of minute branches in a typical 1G2D structure. Referring to FIG. 18, after the initial driving, the texture appears at 500 ms, 1000 ms, 2000 ms, and 3000 ms.

Figure 19:
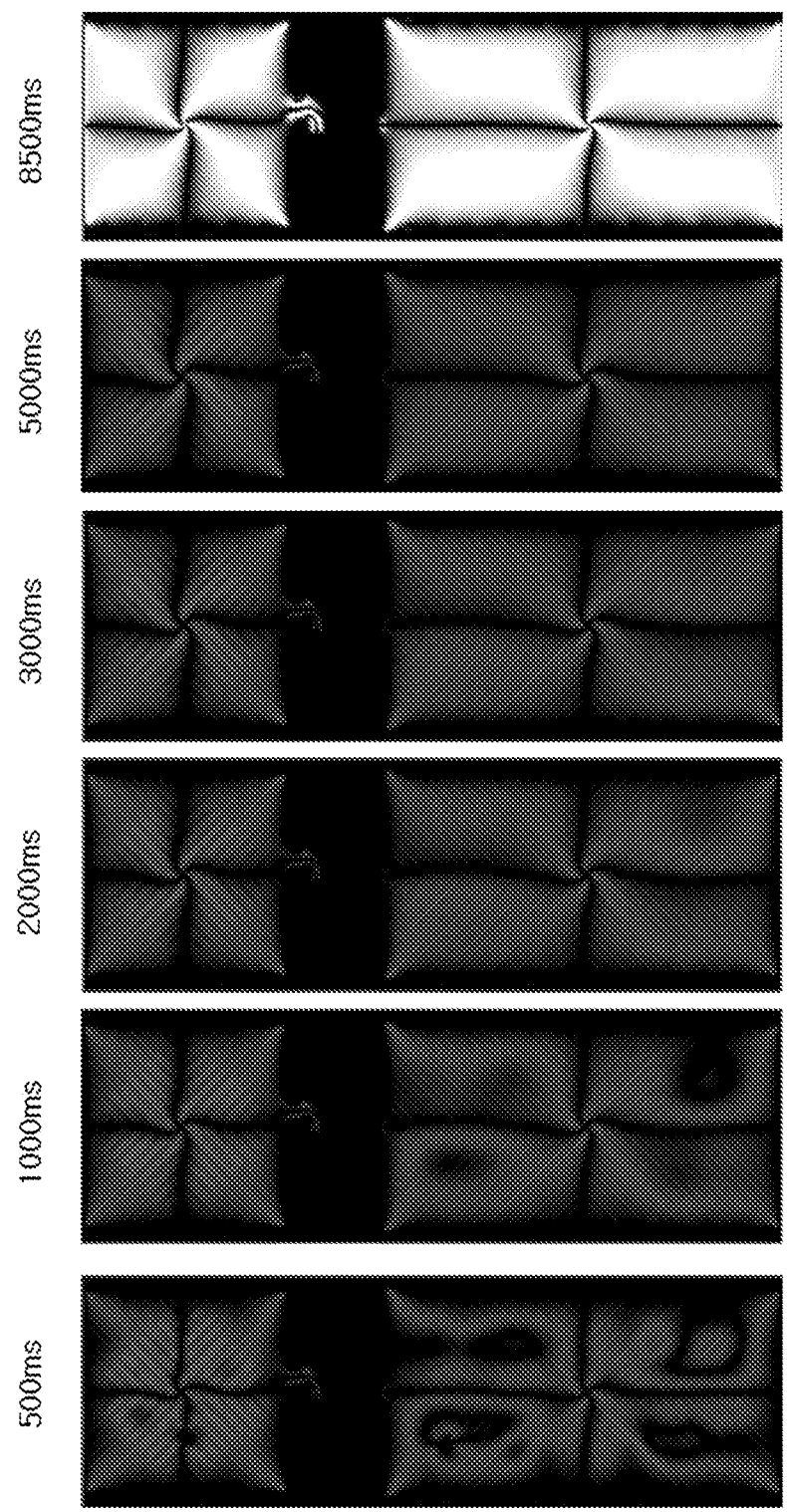
FIG. 19 is a photo of a case that the liquid crystal display according to the exemplary embodiment of FIG. 1 is driven.

FIG. 19 is a photo of a case that the liquid crystal display according to the exemplary embodiment of FIG. 1 is driven.

Referring to FIG. 1 and FIG. 19, according to an exemplary embodiment of the present invention, when the first sub-pixel electrode 191a includes the minute plate branches 195 disposed neighboring the cross stem, the texture is remarkably decreased from 2000 ms after initial driving.

Figure 20:
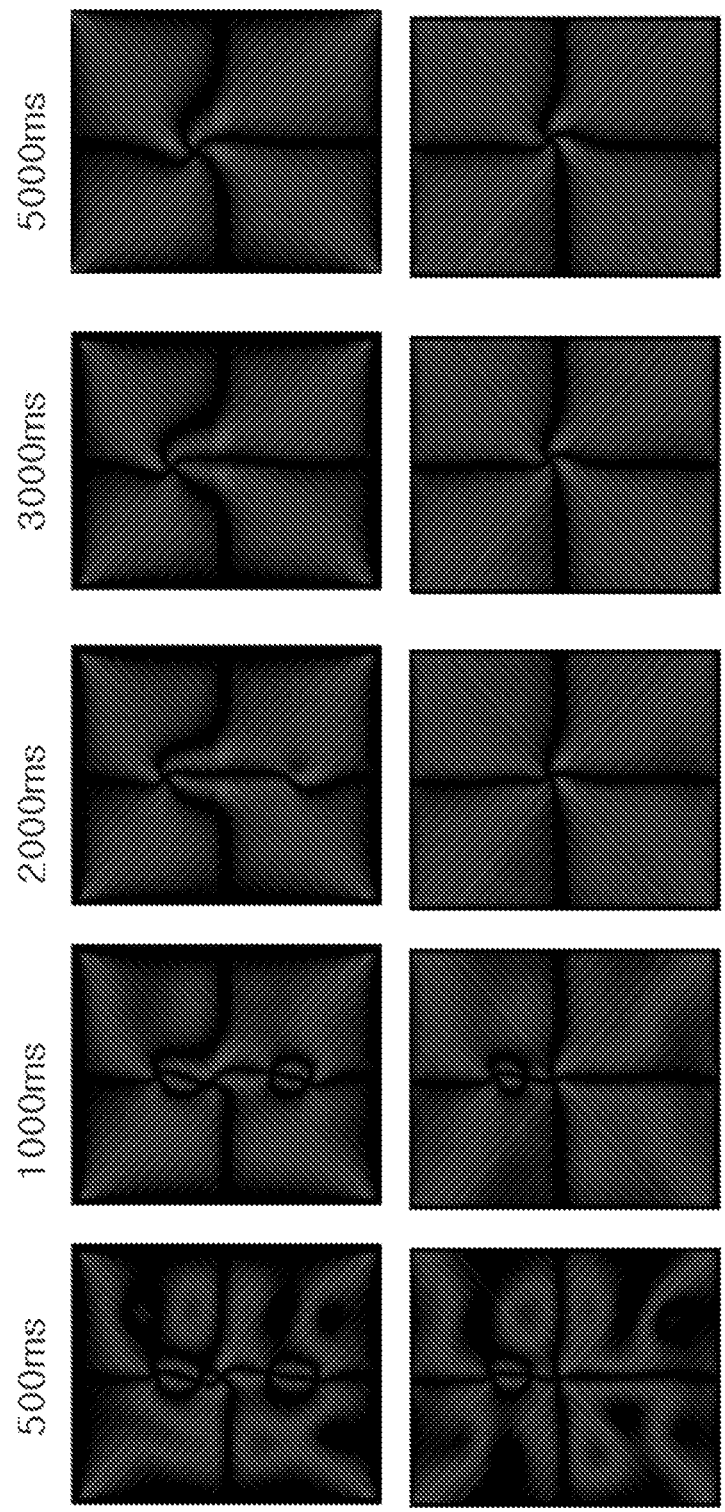
FIG. 20 compares a photo of a case of the liquid crystal display according to the exemplary embodiment of FIG. 9 and a photo of a comparative example.

FIG. 20 compares a photo of a case of the liquid crystal display according to the exemplary embodiment of FIG. 9 with a photo of a comparative example.

In FIG. 20, the photos of the first row are of a driving of a liquid crystal display according to a comparative example of the present invention, and the photos of the second row are of a driving of a liquid crystal display according to the exemplary embodiment of FIG. 9. In detail, the comparative example is a simulation of a case that a pixel electrode pattern is made of a plurality of minute branches having the same width, and the exemplary embodiment of FIG. 9 is a result of simulating a case that the center portion of a plurality of minute branches includes an X bar having the relatively wide width in the pixel electrode pattern.

Referring to FIG. 20, in the comparative example, the texture control is stable at 5000 ms after initial driving, whereas in the case of the exemplary embodiment of FIG. 9, the texture control is stable at 2000 ms after initial driving.

Figure 21:
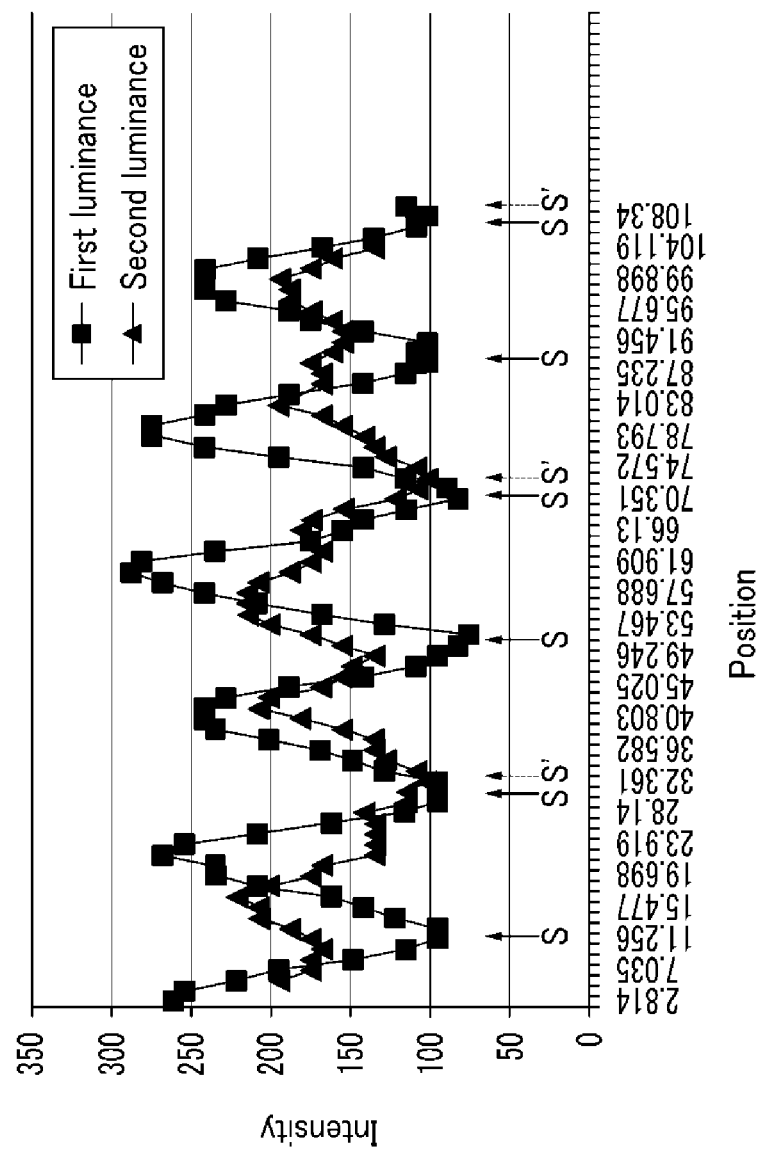
FIG. 21 is a graph of luminance according to the position in the exemplary embodiment of FIG. 1.
Figure 22:
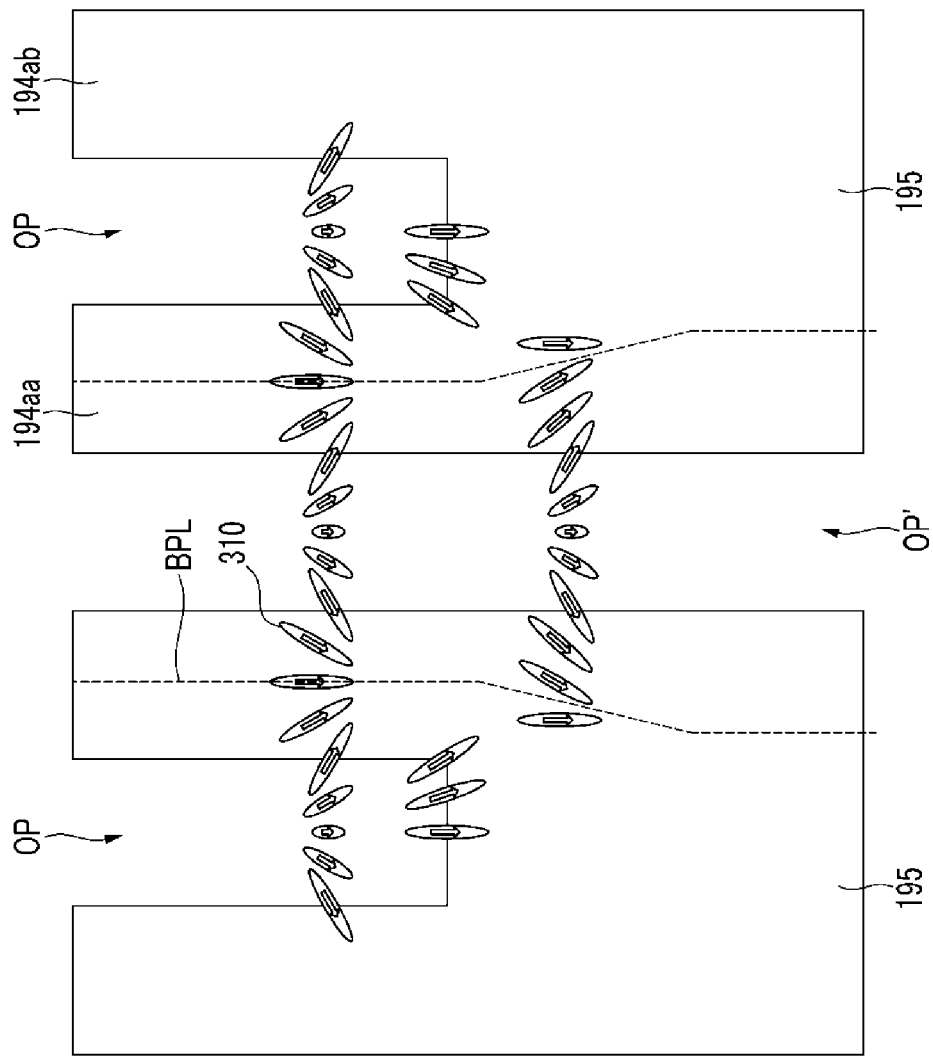
FIG. 22 is an enlarged view of a minute plate branch in the exemplary embodiment of FIG. 1.

FIG. 21 is a graph of luminance according to position in the exemplary embodiment of FIG. 1. In detail, the luminance according to the position in the line X-Y of FIG. 3 is indicated by a first luminance, and the luminance according to the position in the line X'-Y' of FIG. 3 is indicated by a second luminance. FIG. 22 is an enlarged view of a minute plate branch in the exemplary embodiment of FIG. 1.

Referring to FIG. 21, the luminance change at a plurality of minute branches 194a and an open part OP between the neighboring minute branches 194aa and 194ab is indicated by the first luminance. The first luminance represents a maximum luminance at the minute branch 194a, and a minimum luminance at the position S corresponding to the open part OP. Similarly, the luminance change at a plurality of minute branches 195 and an open part OP' between the neighboring minute branches 195 is indicated by the second luminance, the second luminance represents the maximum luminance at the minute plate branches 195, and the minimum luminance represents in the position S' corresponding to the open part OP'.

However, referring to the second luminance in detail, based on FIG. 5, it may be noted that the luminance is decreased in the center portion of the minute plate branches 195, and the maximum luminance occurs at the right portion and the left portion of the minute plate branches 195. Here, the right portion or the left portion indicates a region disposed between the center portion of the minute plate branches 195 and the edge portion. Referring to FIG. 3, the portions of two minute branches 194aa and 194ab are connected thereby forming the minute plate branch 195, one among the open parts OP between the minute branch 194a corresponds to the center portion of the minute plate branch 195, and one among the open parts OP between the minute branches 194a is connected to the open part OP' between the minute plate branches 195 such that the graph may be analyzed as described above.

The reason for this effect will be described with reference to FIG. 22.

Referring to FIG. 22, in a viewpoint on the plane surface, the shape in which the liquid crystal molecules 310 are arranged is shown, and as the shape of the liquid crystal molecules 310 is closer to a circle, the liquid crystal molecules 310 are arranged almost vertically, while if the long axis of the oval is long, the shape in which the liquid crystal molecules 310 are largely inclined is shown.

When the liquid crystal molecules 310 are arranged parallel to a direction that the minute plate branches 195 or the minute branches 194aa and 194ab extend, the maximum luminance may appear, and a line connecting the arrangement of the liquid crystal molecules 310 representing the maximum luminance in FIG. 22 is indicated by a luminance peak line BPL.

If the luminance peak line BPL transverses the center portion of the minute branch 194a and meets the minute plate branch 195, the luminance peak line BPL progresses while being slightly inclined to the center portion of the minute plate branch 195 and then again extends along the initial direction.

The fringe field acts on both sides in the minute branch 194a such that the strongest fringe field is applied in the center portion of the minute branch 194a. Accordingly, the luminance peak line BPL extends while crossing the center portion of the minute branch 194a. However, the open part that is originally disposed at the center portion of the minute plate branch 195 is filled with an electrode material in the minute plate branch 195 such that the fringe field applied at the right side of the minute plate branch 195 is stronger than the fringe field applied in the left side of the minute plate branch 195. Accordingly, the luminance peak line BPL obliquely progresses in the line crossing the center portion of the minute branches 194a and then again extends parallel to the line crossing the center portion of the minute branches 194a inside the minute plate branch 195.

Also, the liquid crystal molecules 310 disposed at the center portion of the minute plate branches 195 are far from the open part OP' compared with the minute branch 194a such that the force of the fringe field is relatively weak, thereby the controllability of the liquid crystal molecules 310 is decreased. Accordingly, the luminance tends to be decreased compared with the surroundings.

The exemplary embodiment in FIG. 1 to FIG. 3 partially groups the minute branches to form the minute plate branch and the width of the minute branch is increased such that the spot margin may be obtained while improving the transmittance, however the luminance may be partially and slightly decreased. To improve this luminance decrease, a compensated exemplary embodiment will be described.

Figure 23:
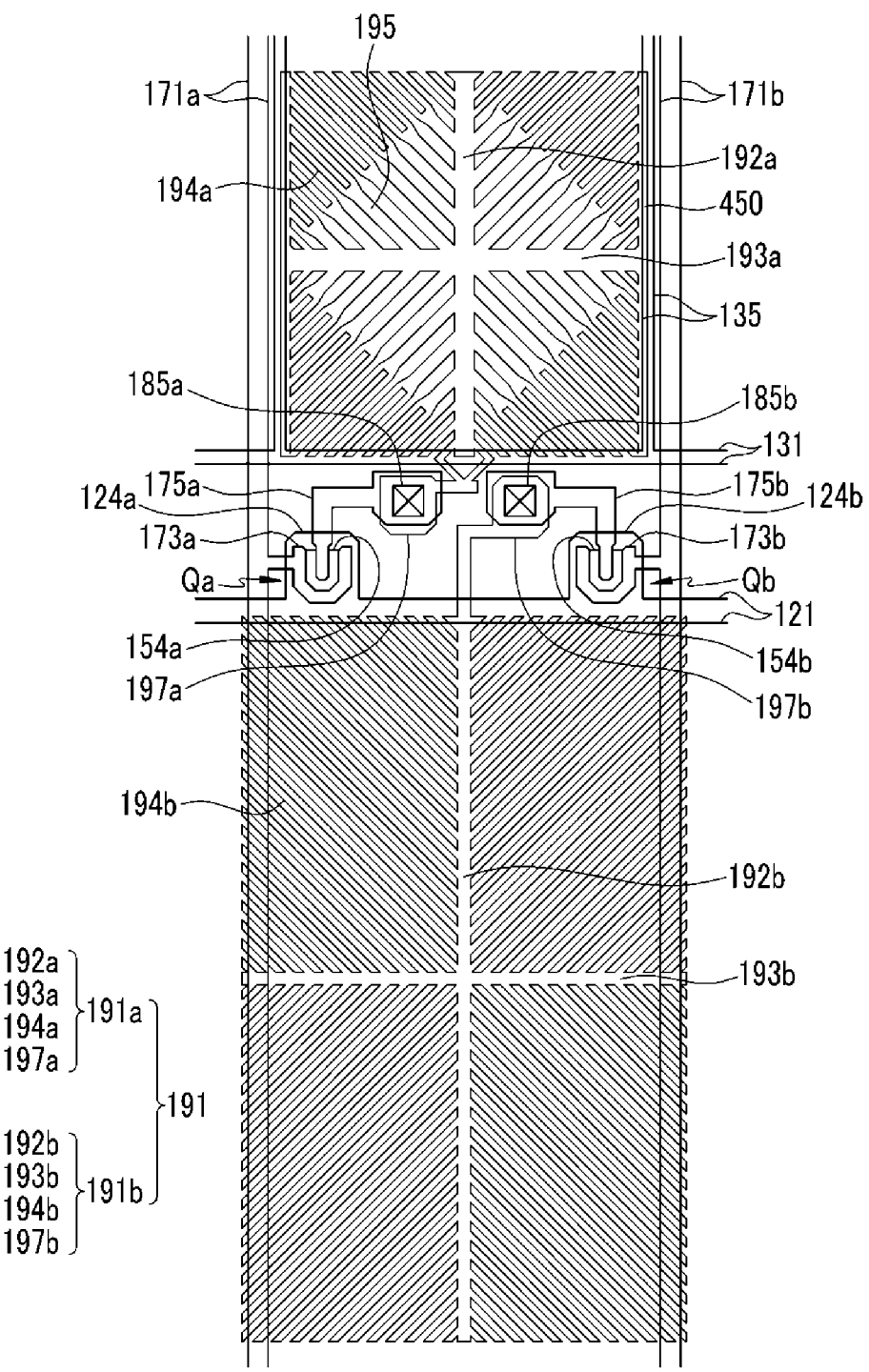
FIG. 23 is a top plan view of a liquid crystal display according to another exemplary embodiment of the present invention.
Figure 24:
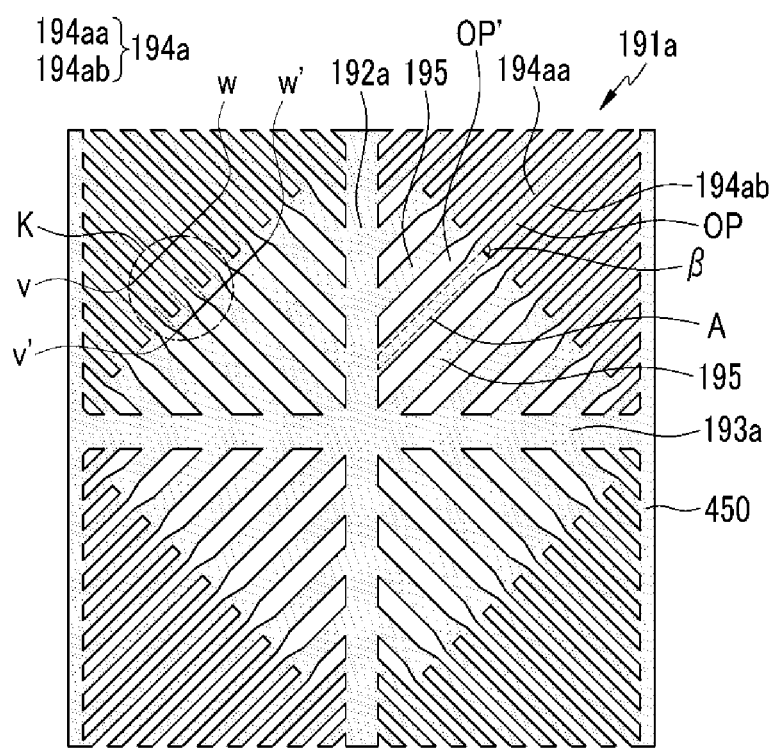
FIG. 24 is a top plan view of a pattern of one sub-pixel electrode in the exemplary embodiment of FIG. 23.
Figure 25:
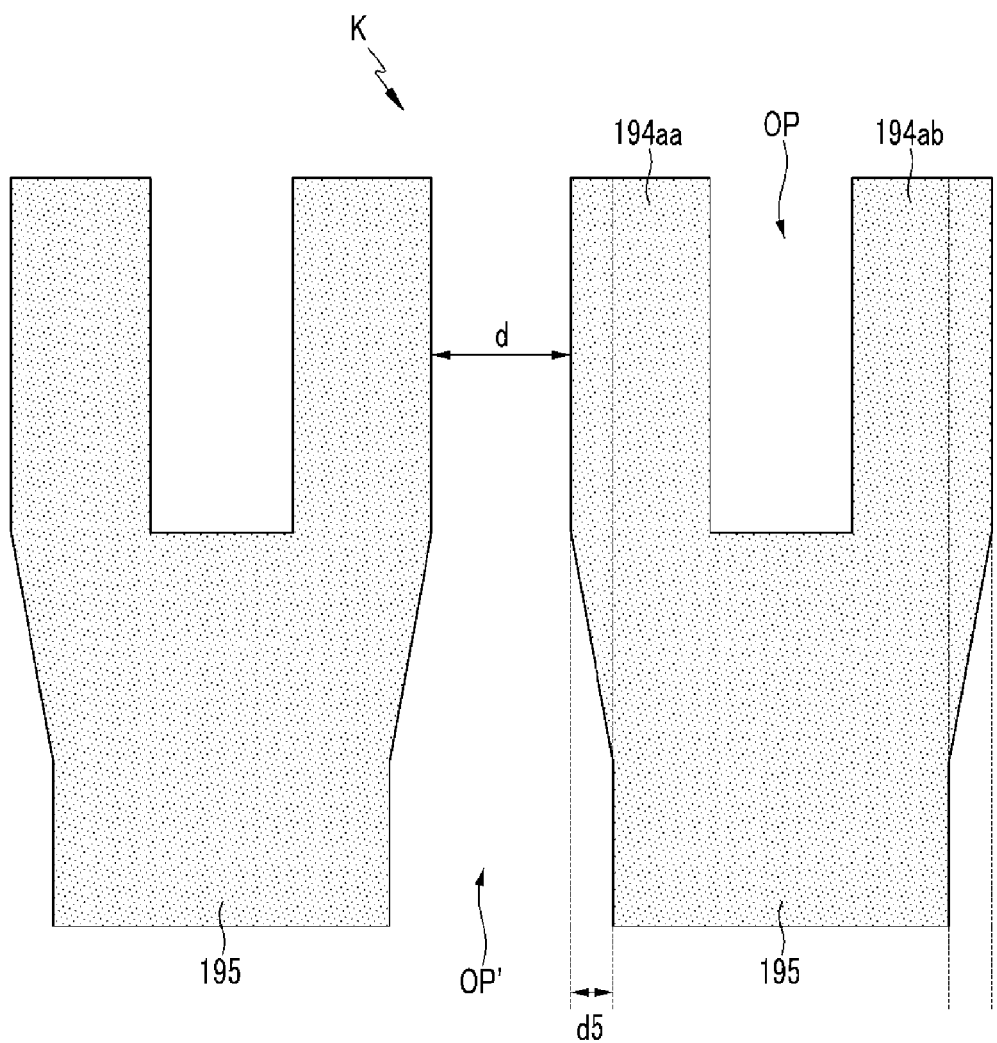
FIG. 25 is an enlarged view of a minute plate branch in the exemplary embodiment of FIG. 23.

FIG. 23 is a top plan view of a liquid crystal display according to another exemplary embodiment of the present invention. FIG. 24 is a top plan view of a pattern of one sub-pixel electrode in the exemplary embodiment of FIG. 23. FIG. 25 is an enlarged view of a minute plate branch in the exemplary embodiment of FIG. 23.

Most constituent elements of the exemplary embodiment of FIG. 23, FIG. 24, and FIG. 25 are the same as in the exemplary embodiment described in FIG. 1, FIG. 2, and FIG. 3. Accordingly, the description of FIG. 1, FIG. 2, and FIG. 3 may be applied to the exemplary embodiment of FIG. 23, FIG. 24, FIG. 25, and FIG. 26, and differences will be described below.

Referring to FIG. 23, FIG. 24, and FIG. 25, unlike the exemplary embodiment of FIG. 1, FIG. 2, and FIG. 3, the width of the first open part OP disposed between the minute branches 194a is smaller than the width of the second open part OP' disposed between the minute plate branches 195. In other words, the width d+d5 of the second open part OP' corresponding to the space between the neighboring minute plate branches 195 is wider than the width d of the first open part OP corresponding to the space between the neighboring minute branches 194a. At this time, a portion from the first open part OP to the second open part OP' may have the width that is gradually increased, and the portion from the minute branch 194a to the minute plate branch 195 may have the width that is gradually decreased corresponding thereto.

In the present exemplary embodiment, the width of the minute plate branch 195 is decreased such that the luminance decreasing region is reduced, thereby improving the luminance compared with the exemplary embodiment of FIG. 1, FIG. 2, and FIG. 3.

The value d5 of the decreasing width of the minute plate branch 195 may be about 10% to about 25% of the width of the first open part d.

Figure 26:
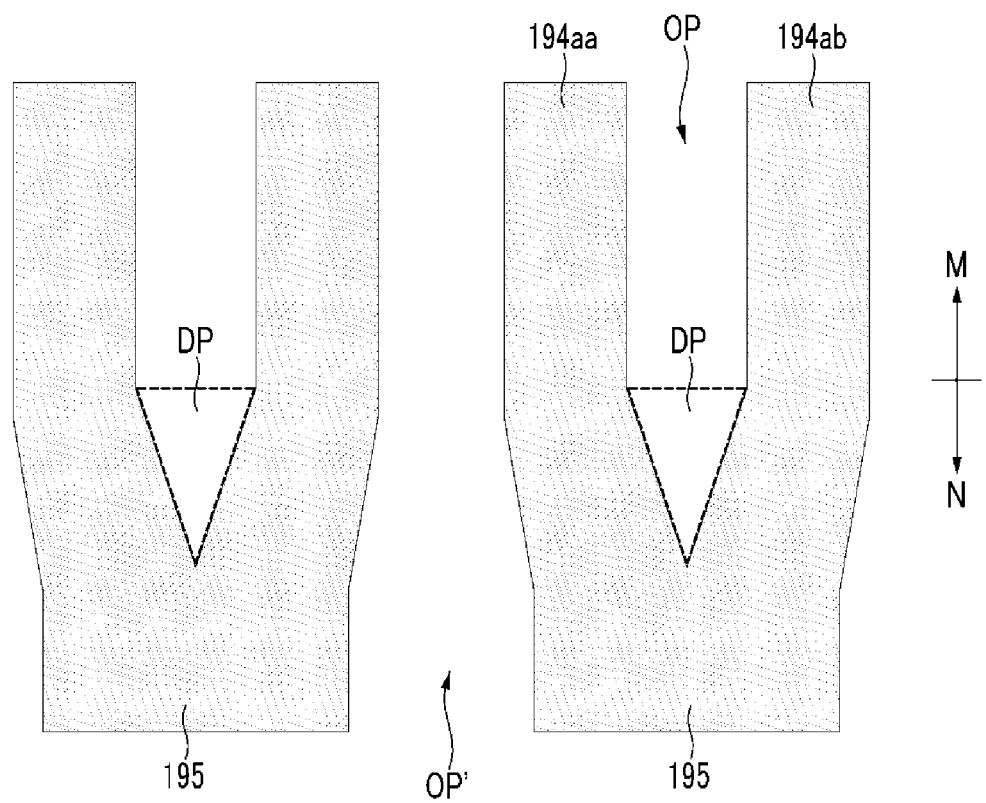
FIG. 26 is an enlarged view of a minute plate branch according to another exemplary embodiment of the present invention.
Figure 27:
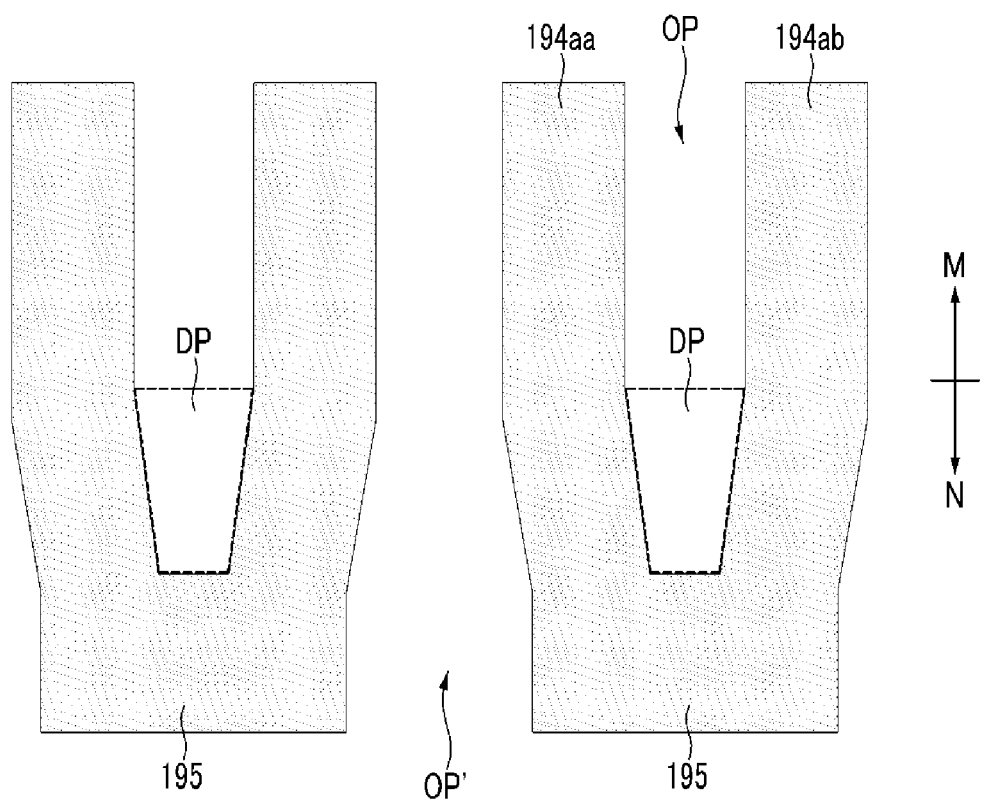
FIG. 27 is an enlarged view of a minute plate branch according to another exemplary embodiment of the present invention.

FIG. 26 and FIG. 27 are enlarged views of a minute plate branch according to another exemplary embodiment of the present invention.

Referring to FIG. 26 and FIG. 27, the present exemplary embodiment is almost the same as the exemplary embodiment of FIG. 23 to FIG. 25, however the first open part 194a extends toward the minute plate branch 195 thereby forming a depressed part DP. At this time, in the exemplary embodiment of FIG. 26, the depressed part DP has a triangle shape, particularly an isosceles triangle shape, and in the exemplary embodiment of FIG. 27, the depressed part DP has a trapezoid shape, particularly an isosceles trapezoid shape.

If the slope of the side surface from the minute branch 194a to the minute plate branch 195 is sharp, the liquid crystal molecules may be slanted in a direction opposite to the original direction of inclination such that the texture may be generated. However, by forming the depressed part DP like the exemplary embodiment of FIG. 26 and FIG. 27, the slope of the side surface from the minute branch 194a to the minute plate branch 195 is smooth such that a contrary slant of the liquid crystal molecules may be prevented while improving the luminance in the minute plate branch 195.

Figure 28:
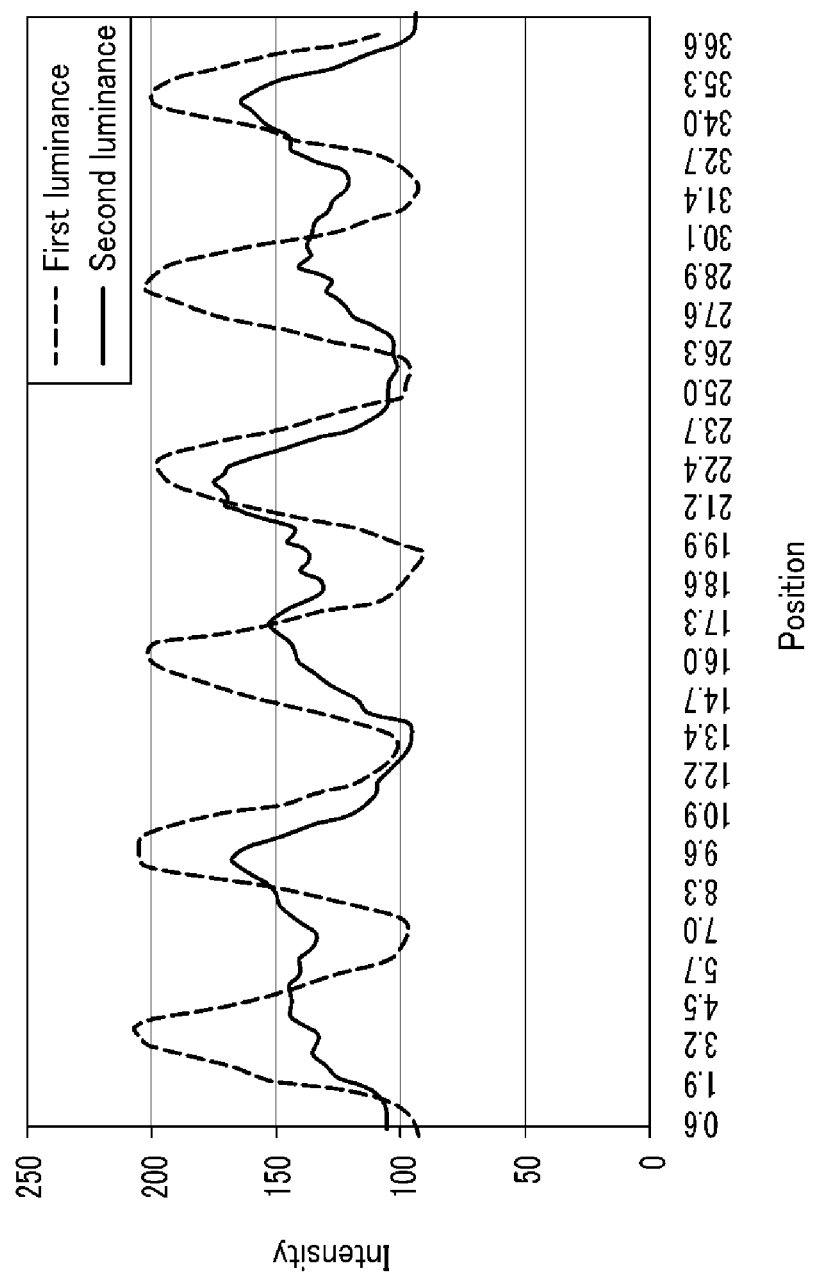
FIG. 28 is a graph of luminance according to the position in the exemplary embodiment of FIG. 23.

FIG. 28 is a graph of luminance according to the position in the exemplary embodiment of FIG. 23. In detail, the luminance according to the position in the line V-W of FIG. 24 is indicated by the first luminance, and the luminance according to the position in the line V'-W' of FIG. 24 is indicated by the second luminance.

Referring to FIG. 28, the luminance change at a plurality of minute branches 194a and the first open part OP between the neighboring minute branches 194aa and 194ab is indicated by the first luminance. The first luminance represents the maximum luminance at the minute branch 194a, and the minimum luminance at the open part OP. Similarly, the luminance change at a plurality of minute branches 195 and an open part OP' between the neighboring minute branches 195 is indicated by the second luminance, and the second luminance represents the maximum luminance at the minute plate branches 195 and the minimum luminance at the open part OP'.

The second luminance will now be described in detail. The luminance is slightly decreased in the center portion of the minute plate branch 195, and it may be confirmed that the decreasing width of the luminance in the exemplary embodiment of FIG. 1 to FIG. 3 shown in FIG. 21 is largely reduced.

Figure 29:
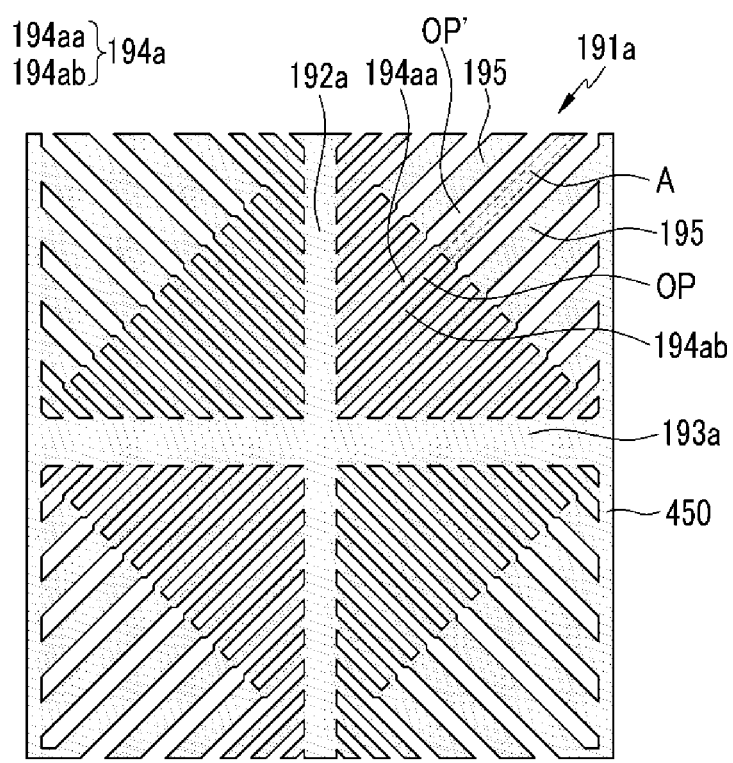
FIG. 29 is a top plan view of a pattern of one sub-pixel electrode according to another exemplary embodiment of the present invention.

FIG. 29 is a top plan view of a pattern of one sub-pixel electrode according to another exemplary embodiment of the present invention.

Referring to FIG. 29, similar to the pattern of the sub-pixel electrode described in FIG. 24, the overall shape of the first sub-pixel electrode 191a is a quadrangle, and includes a cross stem having a longitudinal stem 192a and a transverse stem 193a crossing the longitudinal stem 192a. Also, the first sub-pixel electrode 191a is divided into four regions by the transverse stem 193a and the longitudinal stem 192a, and each of the sub-regions includes a plurality of minute branches 194a and a plurality of minute plate branches 195 extending in the oblique directions. Also, the width of the first open part OP disposed between the minute branches 194a is smaller than the width of the second open part OP' disposed between the minute plate branches 195.

However, the position where the minute branch 194a and the minute plate branch 195 are formed is different from the description of FIG. 24. In detail, in the present exemplary embodiment, the minute branch 194a extends from the transverse stem 193a or the longitudinal stem 192a, and the minute plate branch 195 is connected to the end of the minute branch 194a. That is, the minute branch 194a is arranged in the center portion near the cross stem, and the minute plate branch 195 is arranged along the edge portion of the first sub-pixel electrode 191a.

The overall shape of the minute branch 194a is a rhombus, and may be symmetrical up/down or right/left based on the cross stem. Also, the minute branch 194a may form a square. The overall shape of the first sub-pixel electrode 191a is the quadrangle, and at the point where the first sub-pixel electrode 191a includes the first region where the minute branch 194a is disposed and the second region where the minute plate branch 195 is disposed, the second region where the minute plate branch 195 is substantially the same as a region excluding the shape of the first region from the quadrangle shape of the first sub-pixel electrode 191a.

One end of the minute plate branch 195 is connected by the circumferential pattern 450 at the right and left edge portions of the first sub-pixel electrode 191a.

Except for the above-described differences, the contents described in FIG. 24 may be applied to the exemplary embodiment of FIG. 29.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a thin film transistor formed on the first substrate; and
   a first electrode disposed on the thin film transistor and connected to an output terminal of the thin film transistor,
   wherein the first electrode comprises a first region comprising a plurality of branches separated from each other via a first open part, and a second region where portions of at least two branches among a plurality of branches forming a plurality of plate branches have a wider width than a branch,
   wherein the plurality of plate branches are separated from each other via a second open part,
   wherein a width of the first open part and a width of the second open part are different from each other,
   wherein the first electrode comprises a cross stem comprising a transverse stem and a longitudinal stem intersecting the transverse stem,
   wherein the plurality of plate branches extend from the cross stem, and
   wherein the first region is disposed at the edge portion in the first electrode and the second region is disposed between the first region and the cross stem.

2. The liquid crystal display of claim 1, wherein:
   the first open part extends toward a plate branch among the plurality of plate branches between two neighboring branches among the plurality of branches to form a depressed part; and
   a plate branch is formed by connecting the portions of two branches.

3. The liquid crystal display of claim 2, wherein the depressed part is a triangle.

4. The liquid crystal display of claim 2, wherein the depressed part is a trapezoid.

5. The liquid crystal display of claim 1, wherein the width of the second open part is larger than the width of the first open part by about 10% to about 25% of the width of the first open part.

6. The liquid crystal display of claim 1, wherein the portion from the first open part to the second open part has a shape in which the width is gradually increased.

7. The liquid crystal display of claim 1, wherein the second region where the plurality of plate branches are disposed is symmetrical with respect to the cross stem.

8. The liquid crystal display of claim 7, wherein the first electrode comprises a plurality of regions where the plurality of plate branches or the plurality of branches extend from the cross stem in different directions.

9. The liquid crystal display of claim 8, wherein the second region where the plurality of plate branches are disposed is a square.

10. The liquid crystal display of claim 9, wherein the branch extends from an end of the plate branches extending from the cross stem.

11. The liquid crystal display of claim 10, wherein the plate branch forms an angle of about 45 degrees with the transverse stem or the longitudinal stem.

12. The liquid crystal display of claim 11, wherein the transverse stem and the longitudinal stem have different widths.

13. A liquid crystal display comprising:
    a first substrate;
    a thin film transistor formed on the first substrate; and
    a first electrode disposed on the thin film transistor and connected to an output terminal of the thin film transistor,
    wherein the first electrode comprises a first region comprising a plurality of branches separated from each other via a first open part, and a second region where portions of at least two branches among a plurality of branches forming a plurality of plate branches have a wider width than a branch,
    wherein the plurality of plate branches are separated from each other via a second open part,
    wherein a width of the first open part and a width of the second open part are different from each other,
    wherein the first electrode comprises a cross stem comprising a transverse stem and a longitudinal stem intersecting the transverse stem,
    wherein the plurality of branches extend from the cross stem, and
    wherein the second region is disposed at an edge portion in the first electrode and the first region is disposed between the second region and the cross stem.

14. The liquid crystal display of claim 13, wherein the second region comprising the plurality of plate branches is symmetrical with respect to the cross stem.

15. The liquid crystal display of claim 14, wherein the first electrode comprises a plurality of regions where the plurality of plate branches or the plurality of branches extend from the cross stem in different directions.

16. The liquid crystal display of claim 15, wherein the plate branch extends from an end of the branches extending from the cross stem.

17. The liquid crystal display of claim 16, wherein the plate branch forms an angle of about 45 degrees with the transverse stem or the longitudinal stem.

18. The liquid crystal display of claim 17, wherein the transverse stem and the longitudinal stem have different widths.

19. The liquid crystal display of claim 1, wherein the branch and the plate branch extend in a direction parallel to each other.

20. The liquid crystal display of claim 1, further comprising:
    a second substrate facing the first substrate; and
    a second electrode disposed on the second substrate, wherein the second electrode has a plate shape.

* * * * *